US012630654B2

(12) United States Patent
Imaizumi et al.

(10) Patent No.: US 12,630,654 B2
(45) Date of Patent: May 19, 2026

(54) EMULSION PARTICLE-CONTAINING AQUEOUS DISPERSION

(71) Applicant: NIPPON SHOKUBAI CO., LTD., Osaka (JP)

(72) Inventors: Yohei Imaizumi, Suita (JP); Yoshimine Sakamoto, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 778 days.

(21) Appl. No.: 17/632,445

(22) PCT Filed: Aug. 4, 2020

(86) PCT No.: PCT/JP2020/029733

§ 371 (c)(1),
(2) Date: Feb. 2, 2022

(87) PCT Pub. No.: WO2021/024999

PCT Pub. Date: Feb. 11, 2021

(65) Prior Publication Data

US 2022/0275117 A1 Sep. 1, 2022

(30) Foreign Application Priority Data

Aug. 5, 2019 (JP) ................................ 2019-143697
Jan. 21, 2020 (JP) ................................ 2020-007577

(51) Int. Cl.

*C08F 2/30* (2006.01)
*C08F 2/44* (2006.01)
*C08F 20/14* (2006.01)
*C08F 212/08* (2006.01)
*C08F 220/18* (2006.01)

(52) U.S. Cl.

CPC .................. *C08F 2/30* (2013.01); *C08F 2/44* (2013.01); *C08F 20/14* (2013.01)

(58) Field of Classification Search

CPC .... C08F 2/30; C08F 2/44; C08F 20/14; C08F 220/1806; C08F 220/1818; C08F 212/08
See application file for complete search history.

(56) References Cited

U.S. PATENT DOCUMENTS

2005/0075453 A1 4/2005 Mathauer et al.
2006/0167178 A1 7/2006 Kitamura et al.
2010/0261840 A1 10/2010 Breiner et al.
2011/0227990 A1 9/2011 Kuwabara et al.
2013/0164226 A1* 6/2013 Nakamoto ........... A61K 31/045 424/43
2015/0191869 A1 7/2015 Hara et al.
2019/0077984 A1 3/2019 Kawabe et al.

FOREIGN PATENT DOCUMENTS

CN 108716141 A 10/2018
JP 6-192341 A 7/1994
JP 10- 114847 A 5/1998
JP 2002-502893 A 1/2002
JP 2003-12709 A 1/2003
JP 2008-255194 A 10/2008
JP 2010-540762 A 12/2010
JP 2011-190415 A 9/2011
JP 2014-82149 A 5/2014
JP 2017-165873 A 9/2017
WO WO 2004/074327 A1 9/2004
WO WO 2014/007344 A1 1/2014

OTHER PUBLICATIONS

Forster et al., "Emulsification by the phase inversion temperature method: the role of self-bodying agents and the influence of oil polarity," Int. J. Cosmet. Sci., 12, 217-227 (1990). (Year: 1990).*
International Search Report issued on Oct. 27, 2020 in PCT/JP2020/029733 filed on Aug. 4, 2020, 3 pages.
Extended European Search Report issued Aug. 4, 2023, in corresponding European Patent Application No. 20850568.5, 8 pages.
Förster TH.et al: "Production Of Fine Disperse And Long-Term Stable Oil-In-Water Emulsions By The Phase Inversion Temperature Method", Journal Of Dispersion Science And Technology., vol. 13, No. 2, Apr. 27, 1992 (Apr. 27, 1992), pp. 183-193, XP093067797, New York, NY, US, ISSN: 0193-2691, DOI: 10.1080/01932699208943306 Retrieved from the Internet: URL:http://dx.doi.org/10.1080/01932699208943306.

* cited by examiner

*Primary Examiner* — Catherine S Branch
(74) *Attorney, Agent, or Firm* — Oblon, McClelland, Maier & Neustadt, L.L.P.

(57) ABSTRACT

This aqueous dispersion contains monomer emulsion particles comprising a monomer component, wherein the monomer component contains (A) at least one monomer X selected from the group consisting of styrene-based monomers and alkyl (meth)acrylates including an alkyl group having 4 to 12 carbon atoms, (B) a nonionic emulsifier, (C) an aliphatic organic acid (alkyl ester) having 15 or more carbon atoms, and (D) a lipophilic active component, and the mean particle size of the monomer emulsion particles is 10 to 200 nm.

9 Claims, No Drawings

EMULSION PARTICLE-CONTAINING AQUEOUS DISPERSION

TECHNICAL FIELD

The present invention relates to an emulsion particles-containing aqueous dispersion. More particularly, the present invention relates to a monomer emulsion particles-containing aqueous dispersion useful for, for example, applications such as a paint and a coating agent, a method for producing the same, and a polymer emulsion particles-containing aqueous dispersion made by polymerization of a monomer component contained in the monomer emulsion particle of the monomer emulsion particles-containing aqueous dispersion.

BACKGROUND ART

As a method for producing colored resin fine particles which provide an image having water resistance, weather resistance and scratch resistance, there has been proposed a method which includes carrying out a phase inversion emulsification of a polymerizable unsaturated monomer, a colorant, an emulsifier and a polymerization initiator in an aqueous medium by using a mixer for a paint having a high viscosity, and thereafter polymerizing the polymerizable unsaturated monomer (see, for example, Patent Literature 1).

However, according to the above-mentioned method, the mixer for a paint having a high viscosity is necessitated, and moreover a dispersion stability of the polymerizable unsaturated monomer in the aqueous medium is insufficient. Furthermore, the polymerizable unsaturated monomer is separated from the aqueous medium in a short period of time, and the colorant precipitates in the aqueous medium in a short period of time. Therefore, after the phase inversion emulsification of the polymerizable unsaturated monomer, the colorant, the emulsifier and the polymerization initiator in the aqueous medium, there is a necessity to immediately carry out the polymerization of the polymerizable unsaturated monomer.

Accordingly, in recent years, it has been desired to develop a monomer emulsion particles-containing aqueous dispersion being excellent in dispersion stability of a monomer component which contains an active ingredient such as a colorant, and a monomer.

PRIOR ART LITERATURES

Patent Literatures

Patent Literature 1: Japanese Patent Unexamined Publication No. 2003-12709

SUMMARY OF THE INVENTION

Problems to be Solved by the Invention

The present invention has been made in view of the above-mentioned prior art. An object of the present invention is to provide a monomer emulsion particles-containing aqueous dispersion being excellent in dispersion stability of a monomer component which contains an active ingredient such as a colorant, and a monomer; a method for producing the aqueous dispersion; and a polymer emulsion particles-containing aqueous dispersion made by polymerizing the monomer component contained in the monomer emulsion particles of the monomer emulsion particles-containing aqueous dispersion.

Means for Solving the Problems

The present invention relates to:

(1) an aqueous dispersion including monomer emulsion particles containing a monomer component, wherein the monomer component contains (A) at least one monomer X selected from the group consisting of an alkyl (meth)acrylate having an alkyl group of 4 to 12 carbon atoms and a styrene monomer, (B) a nonionic emulsifier, (C) an aliphatic organic acid (alkyl ester) having 15 or more carbon atoms, and (D) a lipophilic active ingredient, and wherein an average particle diameter of the monomer emulsion particles is 10 to 200 nm;

(2) a method for producing an aqueous dispersion including monomer emulsion particles containing a monomer component, which includes mixing a monomer component with an aqueous medium, in which the monomer component includes (A) at least one monomer X selected from the group consisting of an alkyl (meth) acrylate having an alkyl group of 4 to 12 carbon atoms and a styrene monomer, (B) a nonionic emulsifier, (C) an aliphatic organic acid (alkyl ester) having 15 or more carbon atoms and (D) a lipophilic active ingredient; heating the resulting mixture to a temperature equal to or higher than a phase inversion-initiating temperature of the mixture and lower than a boiling point of the aqueous medium under stirring; and thereafter cooling the mixture to a temperature lower than the phase inversion-initiating temperature of the mixture;

(3) an aqueous dispersion containing polymer emulsion particles, wherein the polymer emulsion particles are made by polymerization of the monomer component included in the monomer emulsion particles according to the above item (1), and an average particle diameter of the polymer emulsion particles is 10 to 200 nm; and (4) an aqueous dispersion containing polymer emulsion particles having a resin layer on its surface, including the polymer emulsion particles according to the above item (3) having a resin layer on its surface, wherein the resin layer is made by polymerization of a monomer component for forming a resin layer.

Effect of the Invention

According to the present invention, a monomer emulsion particles-containing aqueous dispersion being excellent in dispersion stability of a monomer component containing an active ingredient such as a colorant, and a monomer; a method for producing the aqueous dispersion; and a polymer emulsion particles-containing aqueous dispersion made by polymerization of a monomer component contained in the monomer emulsion particles of the monomer emulsion particles-containing aqueous dispersion are provided.

MODE FOR CARRYING OUT THE INVENTION

The monomer emulsion particles-containing aqueous dispersion according to the present invention is an aqueous dispersion including monomer emulsion particles containing a monomer component as described above. The monomer component contains (A) at least one monomer X selected from the group consisting of an alkyl (meth)acrylate having an alkyl group of 4 to 12 carbon atoms and a styrene monomer; (B) a nonionic emulsifier; (C) an aliphatic organic acid (alkyl ester) having 15 or more carbon atoms; and (D) a lipophilic active ingredient. The average particle diameter of the monomer emulsion particles is 10 to 200 nm.

Since the monomer emulsion particles-containing aqueous dispersion according to the present invention has the above configurations, the monomer emulsion particles-containing aqueous dispersion is excellent in dispersion stability of a monomer component which contains an active ingredient such as a colorant, and a monomer, more specifically, dispersion stability of the monomer emulsion particles, which contain the monomer component in the monomer emulsion particles-containing aqueous dispersion (hereinafter referred to as "dispersion stability of monomer emulsion particles-containing aqueous dispersion").

The monomer emulsion particles-containing aqueous dispersion according to the present invention can be prepared, for example, by mixing a monomer component containing (A) at least one monomer X selected from the group consisting of an alkyl (meth)acrylate having an alkyl group of 4 to 12 carbon atoms and a styrene monomer, (B) a nonionic emulsifier, (C) an aliphatic organic acid (alkyl ester) having 15 or more carbon atoms, and (D) a lipophilic active ingredient with an aqueous medium; heating the resulting mixture to a temperature equal to or higher than a phase inversion-initiating temperature of the mixture and lower than a boiling point of the aqueous medium under stirring; and thereafter cooling the mixture to a temperature lower than the phase inversion-initiating temperature of the mixture.

Incidentally, in the present invention, the term "(meth) acrylate" means "acrylate" or "methacrylate". The term "(meth)acrylic" means "acrylic" or "methacrylic". The term "aliphatic organic acid (alkyl ester) having 15 or more carbon atoms" means "at least one compound selected from the group consisting of an aliphatic organic acid having 15 or more carbon atoms and an alkyl ester of an aliphatic organic acid having 15 or more carbon atoms", more specifically, "an aliphatic organic acid having 15 or more carbon atoms and/or an alkyl ester of an aliphatic organic acid having 15 or more carbon atoms".

[(A) Monomer X]

The monomer X is at least one monomer selected from the group consisting of an alkyl (meth)acrylate having an alkyl group of 4 to 12 carbon atoms and styrene monomer. Therefore, the alkyl (meth)acrylate having an alkyl group of 4 to 12 carbon atoms and the styrene monomer can be used alone or in combination.

The alkyl (meth)acrylate having an alkyl group of 4 to 12 carbon atoms includes, for example, n-butyl (meth)acrylate, isobutyl (meth)acrylate, tert-butyl (meth)acrylate, sec-butyl (meth)acrylate, 2-ethylhexyl (meth)acrylate, n-octyl (meth) acrylate, tridecyl (meth)acrylate, cyclohexyl (meth)acrylate, n-lauryl (meth)acrylate, dodecyl (meth)acrylate, isononyl (meth)acrylate, isobornyl (meth)acrylate and the like, and the present invention is not limited only to those exemplified ones. These monomers can be used alone or in combination of two or more kinds thereof. Incidentally, in the present invention, the alkyl (meth)acrylate has a concept including a (meth)acrylate having an alicyclic structure.

Among the alkyl (meth)acrylates, n-butyl (meth)acrylate, isobutyl (meth)acrylate, 2-ethylhexyl (meth)acrylate and cyclohexyl (meth)acrylate are preferred from the viewpoint of improvement in dispersion stability of the monomer emulsion particles-containing aqueous dispersion. These monomers can be used alone or in combination of two or more kinds thereof.

The styrene monomer includes, for example, styrene; alkylstyrenes having an alkyl group of 1 to 4 carbon atoms, such as α-methylstyrene, o-methylstyrene, m-methylstyrene, p-methylstyrene, o-ethylstyrene, m-ethylstyrene, p-ethylstyrene, tert-methylstyrene, o-tert-butylstyrene, m-tert-butylstyrene and p-tert-butylstyrene; alkoxystrenes having an alkoxy group of 1 to 4 carbon atoms, such as o-methoxystyrene, m-methoxystyrene, p-methoxystyrene, o-ethoxystyrene, m-ethoxystyrene, p-ethoxystyrene, o-tert-butoxystyrene, m-tert-butoxystyrene and p-tert-butoxystyrene; halogen atom-containing styrenes such as o-fluorostyrene, m-fluorostyrene, p-fluorostyrene, o-chlorostyrene, m-chlorostyrene, p-chlorostyrene, o-bromostyrene, m-bromostyrene and p-bromostyrene; acetoxystyrenes such as o-acetoxystyrene, m-acetoxystyrene and p-acetoxystyrene; vinyl toluene; and the like. The present invention is not limited only to those exemplified ones. These monomers can be used alone or in combination of two or more kinds thereof. Among the styrene monomers, styrene and the alkylstyrene having 1 to 4 carbon atoms are preferred, and styrene is more preferred, from the viewpoint of improvement in dispersion stability of the monomer emulsion particles-containing aqueous dispersion.

The styrene monomer may have a substituent such as a nitro group, a nitrile group, an alkoxyl group, an acyl group, a sulfone group, a hydroxyl group, or a halogen atom on its benzene ring.

Among the monomer X described above, at least one monomer selected from the group consisting of n-butyl (meth)acrylate, isobutyl (meth)acrylate, 2-ethylhexyl (meth) acrylate, cyclohexyl (meth)acrylate and styrene is preferable from the viewpoint of improvement in dispersion stability of the monomer emulsion particles-containing aqueous dispersion; at least one monomer selected from the group consisting of n-butyl (meth)acrylate, isobutyl (meth)acrylate, 2-ethylhexyl (meth)acrylate and cyclohexyl (meth)acrylate is more preferable; and it is further preferable that cyclohexyl (meth)acrylate and/or 2-ethylhexyl (meth)acrylate is used as an essential component, and at least one monomer selected from the group consisting of n-butyl (meth)acrylate and isobutyl (meth acrylate is arbitrarily used, from the viewpoint of preparation of a monomer emulsion particles-containing aqueous dispersion including monomer emulsion particles having a fine particle diameter.

The total content of cyclohexyl (meth)acrylate and 2-ethylhexyl (meth)acrylate in the monomer X is preferably 50 to 100% by mass, and more preferably 60 to 100% by mass, from the viewpoint of preparation of a monomer emulsion particles-containing aqueous dispersion including monomer emulsion particles having a fine particle diameter. In addition, the total content of the n-butyl (meth)acrylate and the isobutyl (meth)acrylate in the monomer X is preferably 0 to 50% by mass, and more preferably 0 to 10% by mass, from the viewpoint of preparation of a monomer emulsion particles-containing aqueous dispersion including monomer emulsion particles having a fine particle diameter.

The content of the monomer X in the monomer component is preferably 10% by mass or more, more preferably 15% by mass or more, further preferably 20% by mass or more, and still more preferably 25% by mass or more, from the viewpoint of improvement in dispersion stability of the monomer emulsion particles-containing aqueous dispersion. The content of the monomer X in the monomer component is preferably 80% by mass or less, more preferably 70% by mass or less, and furthermore preferably 60% by mass or less, from the viewpoint of improvement in dispersion stability of the monomer emulsion particles-containing aqueous dispersion. In addition, it is preferred that the content of the monomer X in the monomer component is 45% by mass or lower from the viewpoint of miniaturization of the monomer emulsion particles. Therefore, the content of the monomer X in the monomer component is preferably 10 to 80% by mass, more preferably 15 to 70% by mass, further preferably 20 to 60% by mass, and furthermore preferably 25 to 60% by mass.

[(B) Nonionic Emulsifier]

An HLB (hydrophilic-lipophilic balance) of the nonionic emulsifier is preferably 8 or more, more preferably 9 or more, and further preferably 10 or more, from the viewpoint of improvement in dispersion stability of the monomer emulsion particles-containing aqueous dispersion. The HLB of the nonionic emulsifier is preferably 17 or less, more preferably 16 or less, and further preferably 15 or less, from the viewpoint of improvement in dispersion stability of the monomer emulsion particles-containing aqueous dispersion. In addition, the HLB of the nonionic emulsifier is preferably 14 or less, more preferably 13.5 or less, and further preferably 13 or less, from the viewpoint of preparation of a monomer emulsion particles-containing aqueous dispersion including monomer emulsion particles having a fine particle diameter. Therefore, the HLB of the nonionic emulsifier is preferably 8 to 17, more preferably 9 to 16, further preferably 9 to 15, furthermore preferably 10 to 14, still furthermore preferably 10 to 13.5, and particularly preferably 10 to 13. Incidentally, the HLB of the nonionic emulsifier is a value calculated based on a Griffin method by the formula:

[HLB of nonionic emulsifier]=20×[(molecular weight of hydrophilic part)/(molecular weight of emulsifier)].

The nonionic emulsifier includes, for example, ester-type nonionic emulsifiers such as a polyglycerol fatty acid ester and a sucrose fatty acid ester, an ethylene-propylene block copolymer-type nonionic emulsifier, an alkyl ether-type nonionic emulsifier, a phenol-type nonionic emulsifier, an amide-type nonionic emulsifier and the like, and the present invention is not limited only to those exemplified ones. These emulsifiers can be used alone or in combination of two or more kinds thereof.

The nonionic emulsifier is readily available commercially. The nonionic emulsifier which can be readily available commercially includes, for example, trade name: LATEMUL PD-420 (HLB: 12.6) commercially available from Kao Corporation, trade name: SOFTANOL 120 (HLB: 14.5) commercially available from NIPPON SHOKUBAI CO., LTD., trade name: ADEKA REASOAP ER-10 (HLB: 12.1) commercially available from ADEKA CORPORATION and the like, and the present invention is not limited only to those exemplified ones.

Among the nonionic emulsifiers, a nonionic emulsifier having a reactivity is preferred from the viewpoint of incorporation of the nonionic emulsifier into monomer emulsion particles. The nonionic emulsifier having a reactivity is readily available commercially. The nonionic emulsifier having a reactivity, which can be readily available commercially includes, for example, trade name: ADEKA REASOAP ER-10 (HLB: 12.1) commercially available from ADEKA CORPORATION, trade name: LATEMUL PD-420 (HLB: 12.6) commercially available from Kao Corporation and the like, and the present invention is not limited only to those exemplified ones.

The content of the nonionic emulsifier in the monomer component is preferably 1% by mass or more, more preferably 3% by mass or more, further preferably 5% by mass or more, and furthermore preferably 10% by mass or more, from the viewpoint of improvement in dispersion stability of the monomer emulsion particles-containing aqueous dispersion. The content of the nonionic emulsifier in the monomer component is preferably 60% by mass or less, and more preferably 50% by mass or less, from the viewpoint of improvement in dispersion stability of the monomer emulsion particles-containing aqueous dispersion. Therefore, the content of the nonionic emulsifier in the monomer component is preferably 1 to 60% by mass, more preferably 3 to 60% by mass, further preferably 5 to 60% by mass, furthermore preferably 10 to 60% by mass, and even more preferably 10 to 50% by mass.

Incidentally, the nonionic emulsifier may contain other emulsifiers such as an anionic emulsifier, a cationic emulsifier and an amphoteric emulsifier within a range which would not hinder an object of the present invention.

[(C) Aliphatic Organic Acid (Alkyl Ester) Having 15 or More Carbon Atoms]

The aliphatic organic acid (alkyl ester) having 15 or more carbon atoms means an aliphatic organic acid in which the total number of carbon atoms is 15 or more, or an aliphatic organic acid alkyl ester in which the total number of carbon atoms is 15 or more. The aliphatic organic acid having 15 or more carbon atoms and the aliphatic organic acid alkyl ester having 15 or more carbon atoms can be used alone or in combination thereof.

The lower limit of the number of carbon atoms of the aliphatic organic acid (alkyl ester) having 15 or more carbon atoms is 15 or more, preferably 18 or more, and more preferably 22 or more, from the viewpoint of improvement in dispersion stability of the monomer emulsion particles-containing aqueous dispersion. The upper limit of the number of the carbon atoms of the aliphatic organic acid (alkyl ester) having 15 or more carbon atoms is not particularly limited, and is preferably 60 or less, more preferably 50 or less, and further preferably 40 or less, since raw materials for the aliphatic organic acid (alkyl ester) can be easily obtained. Therefore, the number of carbon atoms of the aliphatic organic acid (alkyl ester) is 15 or more, preferably 15 to 60, more preferably 15 to 50, further preferably 18 to 40, and still more preferably 22 to 40.

The aliphatic organic acid (alkyl ester) having 15 or more carbon atoms may have a polymerizable unsaturated double bond. Although the aliphatic organic acid (alkyl ester) having 15 or more carbon atoms and a polymerizable unsaturated double bond has a polymerizable unsaturated double bond, the aliphatic organic acid (alkyl ester) having 15 or more carbon atoms and a polymerizable unsaturated double bond is not included in the monomer X.

The aliphatic organic acid (alkyl ester) having 15 or more carbon atoms includes, for example, organic acid alkyl esters having a polymerizable unsaturated double bond and an alkyl ester moiety of 14 or more carbon atoms, such as tetradecyl (meth)acrylate, hexadecyl (meth)acrylate, stearyl (meth)acrylate, behenyl (meth)acrylate, eicosyl (meth)acrylate and 2-decyltetradecyl (meth)acrylate; aliphatic organic acid alkyl esters having an alkyl ester moiety of 14 or more carbon atoms, such as hexadecyl 2-ethylhexanoate, myristyl myristate, stearyl myristate, stearyl 2-ethylhexanoate and stearyl stearate; aliphatic organic acid alkyl esters having an alkyl group of 14 or more carbon atoms, such as ethyl myristate, isopropyl myristate, butyl myristate, ethyl palmitate, ethyl stearate and 2-ethylhexyl stearate; and the like.

The present invention is not limited only to those exemplified ones. These aliphatic organic acids (alkyl esters) can be used alone or in combination of two or more kinds thereof. Among the aliphatic organic acids (alkyl esters) having 15 or more carbon atoms, the aliphatic organic acid alkyl ester having an alkyl ester moiety of 14 or more carbon atoms and a polymerizable unsaturated double bond, and the aliphatic organic acid alkyl ester having an ester moiety of 14 or more carbon atoms and a polymerizable unsaturated double bond, from the viewpoint of improvement in dispersion stability of the monomer emulsion particles-containing aqueous dispersion.

The content of the aliphatic organic acid (alkyl ester) having 15 or more carbon atoms in the monomer component is preferably 1% by mass or more, more preferably 3% by mass or more, and further preferably 5% by mass or more, from the viewpoint of improvement in dispersion stability of the monomer emulsion particles-containing aqueous dispersion. The content of the aliphatic organic acid (alkyl ester) having 15 or more carbon atoms in the monomer component is preferably 50% by mass or less, more preferably 45% by mass or less, further preferably 40% by mass or less, and furthermore preferably 35% by mass or less, from the viewpoint of improvement in dispersion stability of the monomer emulsion particles-containing aqueous dispersion. Therefore, the content of the aliphatic organic acid (alkyl ester) in the monomer component is preferably 1 to 50% by mass, more preferably 3 to 50% by mass, further preferably 5 to 50% by mass, furthermore preferably 5 to 45% by mass, still more preferably 5 to 40% by mass, and particularly preferably 5 to 35% by mass.

[Other Monomers]

Incidentally, the monomer component may contain other monomers other than (A) the monomer X, (B) the nonionic emulsifier and (C) the aliphatic organic acid (alkyl ester) within a scope which would not hinder an object of the present invention. The other monomers include a monofunctional monomer and a polyfunctional monomer.

The monofunctional monomer includes, for example, an alkyl (meth)acrylate having an alkyl group of 1 to 3 carbon atoms, an acid group-containing monomer, a hydroxyl group-containing (meth)acrylate, a piperidyl group-containing monomer, an oxo group-containing monomer, a fluorine atom-containing monomer, a nitrogen atom-containing monomer, an epoxy group-containing monomer, an alkoxy-alkyl (meth)acrylate, a silane-group containing monomer, a carbonyl group-containing monomer, an aziridinyl group-containing monomer, an aralkyl (meth)acrylate and the like, and the present invention is not limited only to those exemplified ones. These monomers can be used alone or in combination of two or more kinds thereof.

The alkyl (meth)acrylate having an alkyl group of 1 to 3 carbon atoms includes, for example, methyl (meth)acrylate, ethyl (meth)acrylate, n-propyl (meth)acrylate, isopropyl (meth)acrylate and the like, and the present invention is not limited only to those exemplified ones. These monomers can be used alone or in combination of two or more kinds thereof. Among these monomers, ones being excellent in solubility to (D) a lipophilic active ingredient which is described later are preferred. In addition, when a solubility of (A) the monomer X, (B) the nonionic emulsifier and (C) the aliphatic organic acid (alkyl ester) to (D) the lipophilic active ingredient is low, methyl (meth)acrylate is preferred from the viewpoint of improvement in the solubility and control of a phase inversion temperature.

The acid group-containing monomer includes, for example, carboxyl group-containing aliphatic monomers such as acrylic acid, methacrylic acid, maleic acid, fumaric acid, crotonic acid, itaconic acid, citraconic acid, maleic anhydride, maleic acid monomethyl ester, maleic acid monobutyl ester, itaconic acid monomethyl ester, itaconic acid monobutyl ester and vinylbenzoic acid, and the like. The present invention is not limited only to those exemplified ones. These acid group-containing monomers can be used alone or in combination of two or more kinds thereof.

The hydroxyl group-containing (meth)acrylate includes, for example, hydroxyl group-containing (meth)acrylates having an ester moiety of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like. The present invention is not limited only to those exemplified ones. These hydroxyl group-containing (meth)acrylates can be used alone or in combination of two or more kinds thereof.

The piperidyl group-containing monomer includes, for example, 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloyl-1-methoxy-2,2,6,6-tetramethylpiperidine, 4-cyano-4-(meth)acryloyloxy-2,2,6,6-tetramethylpiperidine, 1-(meth)acryloyl-4-(meth)acryloylamino-2,2,6,6-tetramethylpiperidine, 4-chloronoylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 1-(meth)acryloyl-4-cyano-4-(meth)acryloylamino-2,2,6,6-teramethylpiperidine, 1-crotonoyl-4-crotonoyloxy-2,2,6,6-tetramethylpiperidine and the like, and the present invention is not limited only to those exemplified ones. These monomers can be used alone or in combination of two or more kinds thereof.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like. The present invention is not limited only to those exemplified ones. These oxo group-containing monomers can be used alone or in combination of two or more kinds thereof.

The fluorine atom-containing monomer includes, for example, fluorine atom-containing alkyl (meth)acrylates having an ester moiety of 2 to 6 carbon atoms, such as trifluoroethyl (meth)acrylate, tetrafluoropropyl (meth)acrylate and octafluoropentyl (meth)acrylate, and the like. The present invention is not limited only to those exemplified ones. These fluorine atom-containing monomers can be used alone or in combination of two or more kinds thereof.

The nitrogen atom-containing monomer includes, for example, acrylamide compounds such as (meth)acrylamide, N-monomethyl(meth)acrylamide, N-monoethyl(meth)acrylamide, N,N-dimethyl(meth)acrylamide, N-n-propyl(meth)acrylamide, N-isopropyl(meth)acrylamide, methylenebis(meth)acrylamide, N-methylol(meth)acrylamide, N-butoxymethyl(meth)acrylamide, N,N-dimethylaminoethyl(meth)acrylamide, N,N-dimethylaminopropylacrylamide and diacetone acrylamide; nitrogen atom-containing (meth)acrylate compounds such as dimethylaminoethyl (meth)acrylate and diethylaminoethyl (meth)acrylate; N-vinylpyrrolidone; (meth)acrylonitrile; and the like. The present invention is not limited only to those exemplified ones. These nitrogen atom-containing monomers can be used alone or in combination of two or more kinds thereof.

The epoxy group-containing monomer includes, for example, epoxy group-containing (meth)acrylates such as glycidyl (meth)acrylate, α-methylglycidyl (meth)acrylate and glycidyl allyl ether, and the like. The present invention is not limited only to those exemplified ones. These epoxy group-containing monomers can be used alone or in combination of two or more kinds thereof.

The alkoxyalkyl (meth)acrylate includes, for example, methoxyethyl (meth)acrylate, methoxybutyl (meth)acrylate, ethoxybutyl (meth)acrylate, trimethylolpropane tripropoxy (meth)acrylate and the like, and the present invention is not limited only to those exemplified ones. These alkoxyalkyl (meth)acrylates can be used alone or in combination of two or more kinds thereof.

The silane group-containing monomer includes, for example, vinyltrimethoxysilane, vinyltriethoxysilane, vinyltri(methoxyethoxy)silane, γ-(meth)acryloyloxypropyltrimethoxysilane, 2-styrylethyltrimethoxysilane, vinyltrichlorosilane, γ-(meth)acryloyloxypropylhydroxysilane, γ-(meth)acryloyloxypropylmethylhydroxysilane and the like, and the present invention is not limited only to those exemplified ones. These silane group-containing monomers can be used alone or in combination of two or more kinds thereof.

The carbonyl group-containing monomer includes, for example, acrolein, formylstyrol, vinyl ethyl ketone, (meth) acryloyloxyalkyl propenal, acetonitrile (meth)acrylate, diacetone (meth)acrylate, 2-hydroxypropyl (meth)acrylate acetylacetate, butanediol-1,4-(meth)acrylate acetylacetate, 2-(acetoacetoxy)ethyl (meth)acrylate and the like, and the present invention is not limited only to those exemplified ones. These carbonyl group-containing monomers can be used alone or in combination of two or more kinds thereof.

The aziridinyl group-containing monomer includes, for example, (meth)acryloyl aziridine and 2-aziridinylethyl (meth)acrylate and the like, and the present invention is not limited only to those exemplified ones. These aziridinyl group-containing monomers can be used alone or in combination of two or more kinds thereof.

The aralkyl (meth)acrylate includes, for example, aralkyl (meth)acrylates having an aralkyl group of 7 to 18 carbon atoms, such as benzyl (meth)acrylate, phenylethyl (meth) acrylate, methylbenzyl (meth)acrylate and naphthylmethyl (meth)acrylate, and the present invention is not limited only to those exemplified ones. These aralkyl (meth)acrylates can be used alone or in combination of two or more kinds thereof.

The polyfunctional monomer includes, for example, triallyl compounds having 9 to 20 carbon atoms, such as triallyl cyanurate (cyanuric acid triallyl ester), triallyl isocyanurate, triallyl phosphate and triallylamine; di(meth) acrylates of a polyhydric alcohol having 1 to 10 carbon atoms, such as ethylene glycol di(meth)acrylate, propylene glycol di(meth)acrylate, 1,3-butandiol di(meth)acrylate, 1,4-butandiol di(meth)acrylate, 1,6-hexane diol di(meth)acrylate, ethylene oxide-modified 1,6-hexane diol di(meth)acrylate, 1,9-nonane diol di(meth)acrylate, propylene oxide-modified neopentyl glycol di(meth)acrylate and tripropylene glycol di(meth)acrylate; alkyl di(meth)acrylates in which an addition number of moles of an alkylene oxide group having 2 to 4 carbon atoms is 2 to 50, such as polyethylene glycol di(meth)acrylate in which an addition number of moles of ethylene oxide group is 2 to 50, polypropylene glycol di(meth)acrylate in which an addition number of moles of propylene oxide group is 2 to 50 and tripropylene glycol di(meth)acrylate; tri(meth)acrylates of a polyhydric alcohol having 1 to 10 carbon atoms, such as ethoxylated glycerol tri(meth)acrylate, propylene oxide-modified glycerol tri (meth)acrylate, ethylene oxide-modified trimethylolpropane tri (meth)acrylate, trimethylolpropane tri(meth)acrylate, pentaerythritol monohydroxy tri(meth)acrylate and trimethylolpropane triethoxy tri(meth)acrylate; tetra(meth)acrylates of a polyhydric alcohol having 1 to 10 carbon atoms, such as pentaerythritol tetra(meth)acrylate, dipentaerythritol tetra (meth)acrylate and ditrimethylolpropane tetra(meth)acrylate; penta(meth)acrylates of a polyhydric alcohol having 1 to 10 carbon atoms, such as pentaerythritol penta(meth) acrylate and dipentaerythritol penta(meth)acrylate; hexa(meth)acrylates of a polyhydric alcohol having 1 to 10 carbon atoms, such as pentaerythritol hexa(meth)acrylate; epoxy group-containing (meth)acrylates, such as bisphenol A di(meth)acrylate, 2-(2'-vinyloxyethoxyethyl) (meth)acrylate and epoxy (meth)acrylate; polyfunctional (meth)acrylates such as urethane (meth)acrylate; and the like. The present invention is not limited only to those exemplified ones. These polyfunctional monomers can be used alone or in combination of two or more kinds thereof.

[(D) Lipophilic Active Ingredient]

The lipophilic active ingredient is a component for imparting a desired property to the monomer emulsion particles-containing aqueous dispersion, and is a component having lipophilicity or oil solubility with respect to an oily component.

In the present invention, the lipophilic active ingredient means a solid component which dissolves in methyl methacrylate when 1000 g of methyl methacrylate is mixed with 2 g or more of the solid component at room temperature (23° C.), or a liquid component which does not separate from methyl methacrylate when 1000 g of methyl methacrylate is mixed with 30 g or more of the liquid component, and the resulting mixture is allowed to stand for 12 hours at room temperature (23° C.).

Among the lipophilic active ingredients, the solid component which dissolves in an amount of 10 g or more in 1000 g of methyl methacrylate at room temperature (23° C.) is preferred; the solid component which dissolves in an amount of 20 g or more in 1000 g of methyl methacrylate at room temperature (23° C.) is more preferred; and the solid component which dissolves in an amount of 50 g or more in 1000 g of methyl methacrylate at room temperature (23° C.) is further preferred, from the viewpoint of sufficient expression of properties of the active ingredient.

In addition, among the lipophilic active ingredients, the solid component which does not dissolve in an amount of 10 g or more in 1000 g of water at room temperature (23° C.) from the viewpoint of improvement in dispersion stability of the lipophilic active ingredient.

The kind of the lipophilic active ingredient differs depending on uses of the monomer emulsion particles-containing aqueous dispersion. Accordingly, it is preferred that the kind of the lipophilic active ingredient is appropriately selected in accordance with the uses. The lipophilic active ingredient can be a monomer having a polymerizability.

The lipophilic active ingredient includes, for example, oil-soluble colorants such as oil-soluble dyes such as an oil-soluble phthalocyanine near-infrared absorbing colorant, an oil-soluble azo red dye, an oil-soluble chromium complex salt dye and an oil-soluble anthraquinone dye; oil-soluble ultraviolet lay-absorbents such as trade names: Tinuvin (registered trademark) 400, Tinuvin (registered trademark) 900, Tinuvin (registered trademark) 928, Tinuvin (registered trademark) 405, Tinuvin (registered trademark) 460, Tinuvin (registered trademark) 479 and Tinuvin (registered trademark) 970, all of which are commercially available from BASF SE; trade name: RUVA-93 commercially available from Otsuka Chemical Co., Ltd.; trade names: ADK STAB LA-F70 commercially available from ADEKA CORPORATION; trade name: SB-UVA650 commercially available from SHUANG BANG INDUSTRIAL CORP.; and hindered amine light stabilizers [for example, trade name: ADK STAB LA-87 commercially available from ADEKA CORPORATION, and the like]; an oil-soluble crosslinking agent; an oil-soluble antioxidant; an oil-soluble fragrance; an oil-soluble insecticide; an oil-soluble anti-inflammatory analgesic agent; an oil-soluble refreshing agent; an oil-soluble deodorant; and the like. The present invention is not limited only to those exemplified ones. These lipophilic active ingredients can be used alone or in combination of two or more kinds thereof.

The content of the lipophilic active ingredient in the monomer component cannot be absolutely determined because the content differs depending on the kind of the lipophilic active ingredient. The content of the lipophilic active ingredient in the monomer component is preferably 0.03% by mass or more, more preferably 0.1% by mass or more, further preferably 0.3% by mass or more, and furthermore preferably 0.5% by mass or more, from the viewpoint of sufficient expression of properties of the lipophilic active ingredient. The content of the lipophilic active ingredient in the monomer component is preferably 50% by mass or less, more preferably 40% by mass or less, further preferably 30% by mass or less, and furthermore preferably 25% by mass or less, from the viewpoint of improvement in dispersion stability of the monomer emulsion particles-containing aqueous dispersion. Therefore, the content of the lipophilic active ingredient in the monomer component is preferably 0.03 to 50% by mass, more preferably 0.1 to 50% by mass, furthermore preferably 0.3 to 40% by mass, still furthermore preferably 0.5 to 30% by mass, and even furthermore preferably 0.5 to 25% by mass.

[Preparation of Monomer Emulsion Particles-Containing Aqueous Dispersion]

The monomer emulsion particles-containing aqueous dispersion can be prepared by mixing the monomer component with the aqueous medium, heating the resulting mixture to a temperature from a phase inversion-initiating temperature of the mixture to a boiling point of the aqueous medium under stirring; and thereafter cooling the mixture to a temperature lower than the phase inversion-initiating temperature of the mixture, as described above.

When the monomer emulsion particles-containing aqueous dispersion according to the present invention is prepared, at first the monomer component is mixed with the aqueous medium.

The aqueous medium includes, for example, water and a mixed solvent of water and a water-soluble organic solvent. The water-soluble organic solvent includes, for example, lower alcohols such as methyl alcohol, ethyl alcohol, n-propyl alcohol, isopropyl alcohol, n-butyl alcohol and tert-butyl alcohol; polyhydric alcohols such as ethylene glycol, ethylene glycol monomethyl ether, ethylene glycol monobutyl ether and diethylene glycol; ketones such as acetone and methyl ethyl ketone; and the like. The present invention is not limited only to those exemplified ones. These organic solvents can be used alone or in combination of two or more kinds thereof. The content of water in the aqueous medium is preferably 50% by mass or more, more preferably 60% by mass or more, further preferably 70% by mass or more, and furthermore preferably 80% by mass or more, from the viewpoint of improvement in dispersion stability of the monomer emulsion particles-containing aqueous dispersion. The upper limit of the content of water in the aqueous medium is 100% by mass. Among the aqueous medias, water is preferred.

The mass ratio of the monomer component to the aqueous medium (monomer component/aqueous medium) is preferably 20/80 to 50/50, more preferably 25/75 to 45/55, and further preferably 30/70 to 40/60, from the viewpoint of uniform dispersion of the monomer component and the aqueous medium.

The temperature at which the monomer component is mixed with the aqueous medium cannot be absolutely determined, because the temperature differs depending on the phase inversion temperature described later, and the like. The temperature at which the monomer component is mixed with the aqueous medium is usually preferably 5 to 45° C., more preferably 5 to 40° C., and further preferably 5 to 35° C. When the monomer component is mixed with the aqueous medium, it is preferred that the monomer component is added to the aqueous medium under stirring in order to uniformly disperse the monomer component in the aqueous medium. As a means for stirring the aqueous media, there is no necessity to use a special device such as a conventionally used mixer for a high-viscosity paint or a high-pressure homogenizer. The monomer component can be uniformly dispersed in the aqueous medium by means of a simple stirring device such as a stirring rod or a magnetic stirrer.

After the monomer component is mixed with the aqueous medium, the resulting mixture is heated to a temperature equal to or higher than the phase inversion initiating temperature of the mixture and lower than the boiling point of the aqueous medium under stirring. Thereafter, the mixture is cooled to a temperature lower than the phase inversion-initiating temperature of the mixture. In the present invention, since the above procedures are employed, there can be obtained a monomer emulsion particles-containing aqueous dispersion containing the monomer X and the lipophilic active ingredient, being excellent in dispersion stability of the monomer component.

Incidentally, the phase inversion-initiating temperature of the mixture is a value as determined in accordance with a method described in the following Example 1. In the present invention, the lowest temperature of the phase inversion temperatures is defined as the phase inversion-initiating temperature, and the highest temperature of the phase inversion temperatures is defined as the phase inversion-terminating temperature. There is no limitation in the phase inversion temperatures. In the phase inversion temperatures, the phase inversion-initiating temperature is preferably 35° C. or higher, more preferably 45° C. or higher, and further preferably 50° C. or higher, from the viewpoint of improvement in dispersion stability of the monomer emulsion particles-containing aqueous dispersion. In addition, the phase inversion-terminating temperature is preferably 98° C. or lower, more preferably 97° C. or lower, and further preferably 96° C. or lower, from the viewpoint of improvement in stability of the monomer emulsion.

The atmosphere where the mixture is heated is not particularly limited. It is preferred that the atmosphere is an inert gas such as nitrogen gas or argon gas from the viewpoint of avoidance of affects based on oxygen included in the air.

The lower limit of the heating temperature of the mixture (a temperature in heating the mixture) is a temperature equal to or higher than the phase inversion-initiating temperature, preferably a temperature at least 0.5° C. higher than the phase inversion-initiating temperature of the mixture, and more preferably a temperature at least 1° C. higher than the phase inversion-initiating temperature of the mixture, from the viewpoint of improvement in dispersion stability of the monomer emulsion particles-containing aqueous dispersion. In addition, the lower limit of the heating temperature of the mixture (a temperature in heating the mixture) is preferably a temperature equal to or higher than the phase inversion-terminating temperature of the mixture, and more preferably a temperature at least 0.5° C. higher than the phase inversion-terminating temperature of the mixture, from the viewpoint of improvement in dispersion stability of the monomer emulsion particles-containing aqueous dispersion.

The upper limit of the heating temperature of the mixture (the highest temperature in heating the mixture) is usually a temperature lower than the boiling point of the aqueous medium, preferably a temperature at least 3° C. lower than the boiling point of the aqueous medium, and more preferably a temperature at least 5° C. lower than the boiling point of the aqueous medium.

After the temperature of the mixture attains to a temperature equal to or higher than the phase inversion-initiating temperature of the mixture and lower than the boiling point of the aqueous medium, the mixture is cooled to a temperature equal to or lower than the phase inversion temperature of the mixture.

A means for cooling the mixture is not particularly limited. The mixture can be cooled, for example, by allowing the mixture to cool, or air cooling of the mixture. The mixture is cooled to a temperature equal to or lower than the phase inversion-initiating temperature of the mixture. The mixture is cooled to preferably a temperature at least 10° C. lower than the phase inversion-initiating temperature of the mixture, more preferably a temperature at least 20° C. lower than the phase inversion-initiating temperature of the mixture, further preferably a temperature at least 25° C. lower than the phase inversion-initiating temperature of the mixture, and furthermore preferably a temperature at least 30° C. lower than the phase inversion-initiating temperature of the mixture.

The monomer emulsion particles-containing aqueous dispersion according to the present invention can be prepared by employing the above operations. Incidentally, the content of the monomer component in the monomer emulsion particles-containing aqueous dispersion according to the present invention cannot be absolutely determined, because the content differs depending on uses of the monomer emulsion particles-containing aqueous dispersion, and the like. Therefore, it is preferred that the content of the monomer component in the monomer emulsion particles-containing aqueous dispersion according to the present invention is appropriately adjusted in accordance with uses of the monomer emulsion particles-containing aqueous dispersion, and the like. The upper limit of the content of the monomer component is usually 100% by mass.

The average particle diameter of the monomer emulsion particles contained in the monomer emulsion particles-containing aqueous dispersion according to the present invention is usually 10 to 200 nm, preferably 10 to 150 nm. However, according to the method for producing the monomer emulsion particles-containing aqueous dispersion of the present invention, an aqueous dispersion containing very small monomer emulsion particles having an average particle diameter of 10 to 100 nm can be prepared. Incidentally, the average particle diameter of the monomer emulsion particles is a value as determined in accordance with a method described in the following Example 1.

In the monomer emulsion particles-containing aqueous dispersion of the present invention, the monomer component is contained in the monomer emulsion particles. However, the monomer component is not completely contained in the monomer emulsion particles, and sometimes inevitably exists in the aqueous dispersion. Therefore, the monomer component can be suspended or dissolved in the monomer emulsion particles-containing aqueous dispersion according to the present within a scope which would not hinder an object of the present invention.

Incidentally, the monomer emulsion particles-containing aqueous dispersion of the present invention may contain, for example, an additive within a scope which would not hinder an object of the present invention. The additive includes, for example, a colorant such as a pigment, a leveling agent, an ultraviolet absorbing agent, an ultraviolet stabilizing agent, an antioxidant, a polymerization inhibitor, a filler, a coupling agent, a rust preventing agent, an antibacterial agent, a metal deactivator, a wetting agent, a defoaming agent, a surfactant, a reinforcement agent, a plasticizer, a lubricant, an anti-fog agent, an anticorrosive agent, a pigment-dispersing agent, a flow regulating agent, a peroxide decomposer, a mold-decoloring agent, a fluorescent whitening agent, an organic flameproofing agent, an inorganic flameproofing agent, an anti-dropping agent, a melt flow modifier, an antistatic agent, an anti-algae agent, an antifungal agent, a flame retardant, a slip agent, a metal chelating agent, an anti-blocking agent, a heat stabilizer, a processing stabilizer, a dispersant, a thicker, a rheology control agent, a foaming agent, an anti-aging agent, a preservative agent, an antistatic agent, a silane coupling agent, an antioxidant, a film-forming agent, and the like. The present invention is not limited only to those exemplified ones. These additives can be used alone or in combination of two or more kinds thereof. The amount of the additive cannot be absolutely determined because the amount differs depending on kinds of the additive. Therefore, it is preferred that the amount of the additive is appropriately determined in accordance with the kinds of the additive.

The monomer emulsion particles-containing aqueous dispersion according to the present invention is excellent in dispersion stability of the monomer emulsion particles containing the monomer component as described above. Therefore, according to the monomer emulsion particles-containing aqueous dispersion of the present invention, the monomer component can be stably dispersed in the aqueous medium for a long period of time, although according to conventional aqueous dispersions, monomers are separated from an aqueous dispersion in a short period of time, and an active ingredient included in the dispersion is precipitated in a short period of time.

[Polymer Emulsion Particles-Containing Aqueous Dispersion]

The polymer emulsion particles-containing aqueous dispersion can be prepared by using the monomer emulsion particles-containing aqueous dispersion, and polymerizing the monomer component included in the monomer emulsion particles. The monomer component included in the monomer emulsion particles can be usually polymerized by emulsion polymerization.

A method for emulsion-polymerizing the monomer component included in the monomer emulsion particles-containing aqueous dispersion includes, for example, a method which includes dissolving an emulsifier in the monomer emulsion particles-containing aqueous dispersion, and adding a polymerization initiator to the resulting solution. The present invention is not limited only to the above method.

The emulsifier includes an anionic emulsifier, a nonionic emulsifier, a cationic emulsifier, an amphoteric emulsifier, a polymeric emulsifier and the like, and these emulsifiers can be used alone or in combination of two or more kinds thereof.

The anionic emulsifier includes, for example, alkyl sulfate salts such as ammonium dodecylsulfate and sodium dodecylsulfate; alkylsulfonate salts such as ammonium dodecylsulfonate, sodium dodecylsulfonate and sodium alkyldiphenyl ether disulfonate; alkylarylsulfonate salts such as ammonium dodecylbenzenesulfonate and sodium dodecylnaphthalene sulfonate; a polyoxyethylene alkylsulfonate salt; a polyoxyethylene alkylsulfate salt; a polyoxyethylene alkylarylsulfate salt; a dialkyl sulfosuccinic acid salt; an arylsulfonic acid-formalin condensate; fatty acid salts such as ammonium laurate and sodium stealate; sulfuric acid esters having an allyl group and salts thereof, such as a bis(polyoxyethylene polycyclic phenyl ether) methacrylate sulfonate salt, a propenyl-alkylsulfosuccinic acid ester salt, a (meth)acrylic acid polyoxyethylene sulfonate salt, a (meth)acrylic acid polyoxyethylene phosphonate salt and an allyloxymethylalkyloxypolyoxyethylene sulfonate salt; a sulfuric acid ester salt of an allyloxymethylalkoxyethyl polyoxyethylene; an ammonium salt of a polyoxyalkylene alkenyl ether sulfuric acid; and the like. The present invention is not limited only to those exemplified ones.

The nonionic emulsifier includes, for example, a polyoxyethylene alkyl ether, a polyoxyethylene alkylaryl ether, a condensate of a polyethylene glycol and a polypropylene glycol, a sorbitan fatty acid ester, a polyoxyethylene sorbitan fatty acid ester, a fatty acid monoglyceride, a condensation product of ethylene oxide and an aliphatic amine, an allyloxymethylalkoxyethyl hydroxypolyoxyethylene, a polyoxyalkylene alkenyl ether, and the like. The present invention is not limited only to those exemplified ones.

The cationic emulsifier includes, for example, alkyl ammonium salts such as dodecyl ammonium chloride, and the like. The present invention is not limited only to those exemplified ones.

The amphoteric emulsifier includes, for example, a betaine ester type emulsifier and the like, and the present invention is not limited only to the exemplified ones.

The polymeric emulsifier includes, for example, poly(meth)acrylic acid salts such as polyacrylic acid sodium salt; polyvinyl alcohol; polyvinyl pyrrolidone; polyhydroxyalkyl (meth)acrylates such as polyhydroxyethyl acrylate; copolymers of which copolymerizing component is at least one monomer which constitutes these polymers, and the like. The present invention is not limited only to those exemplified ones.

Among the emulsifiers, an emulsifier having a polymerizable group, that is, a so-called reactive emulsifier is preferable from the viewpoint of improvement in weather resistance, and a non-nonylphenyl type emulsifier is preferable from the viewpoint of environmental protection.

The reactive emulsifier includes, for example, a propenyl-alkylsulfosuccinic acid ester salt, a (meth)acrylic acid polyoxyethylene sulfonate salt, a (meth)acrylic acid polyoxyethylene phosphonate salt [for example, trade name: ELEMINOL RS-30 commercially available from SANYOKASEI CO., LTD., and the like], a polyoxyethyleneealkylpropenyl phenyl ether sulfonate salt [for example, trade names: AQARON BC-10 and AQARON HS-10 commercially available from DSK CO., LTD., and the like], a sulfonate salt of an allyloxymethylalkyloxypolyoxyethylene [for example, trade names: AQARON KH-10 commercially available from DSK CO., LTD., and the like], a sulfonate salt of an allyloxymethylnonylphenoxyethyl hydroxypolyoxyethylene [for example, trade name: ADEKA REASOAP SE-10 commercially available from ADEKA CORPORATION, and the like], a sulfuric acid ester salt of an allyloxymethylalkoxyethyl hydroxypolyoxyethylene [for example, trade names: ADEKA REASOAP SR-10 and SR-30 commercially available from ADEKA CORPORATION, and the like], a bis(polyoxyethylene polycyclic phenyl ether)-methacrylated sulfonate salt [for example, trade name: ANTOX MS-60 commercially available from NIPPON NYUKAZAI CO., LTD., and the like], an allyloxymetylalkoxyethylhydroxypolyoxyethylene [for example, trade name: ADEKA REASOAP ER-20 commercially available from ADEKA CORPORATION, and the like], a polyoxyethylenealkylpropenyl phenyl ether [for example, trade name: AQARON RN-20 commercially available from DSK CO., LTD., and the like], an allyloxymethyl nonylphenoxyethyl hydroxypolyoxyethylene [for example, trade name: ADEKA REASOAP NE-10 commercially available from ADEKA CORPORATION, and the like], and the like. The present invention is not limited only to those exemplified ones.

The amount of the emulsifier (nonvolatile component) per 100 parts by mass of the monomer emulsion particles-containing aqueous dispersion is preferably 0.3 parts by mass or more, and more preferably 0.5 parts by mass or more, from the viewpoint of improvement in polymerization stability, and is preferably 5 parts by mass or less, more preferably 3 parts by mass or less, and further preferably 1 part by mass or less, from the viewpoint of improvement in weather resistance.

The polymerization initiator includes, for example, azo compounds such as azobisisobutyronitrile, 2,2-azobis(2-methylbutyronitrile), 2,2-azobis(2,4-dimethylvaleronitrile), 2,2-azobis(2-diaminopropane) hydrochloride, 2,4-azobis(4-cyanovaleric acid) and 2,2-azobis(2-methylpropionamidine); persulfates such as ammonium persulfate and potassium persulfate; peroxides such as hydrogen peroxide, benzoyl peroxide, p-chlorobenzoyl peroxide, lauroyl peroxide and ammonium peroxide; and the like. The present invention is not limited only to those exemplified ones. These polymerization initiators can be used alone or in combination of two or more kinds thereof.

The amount of the polymerization initiator per 100 parts by mass of the monomer emulsion particles-containing aqueous dispersion is preferably 0.03 parts by mass or more, and more preferably 0.04 parts by mass or more, from the viewpoint of increase in a polymerization rate and reduction of a remaining amount of an unreacted monomer component, and is preferably 1 part by mass or less, and more preferably 0.5 parts by mass or less, from the viewpoint of improvement in weather resistance.

A method for adding the polymerization initiator to the monomer emulsion particles-containing aqueous dispersion is not particularly limited. The method includes, for example, a batch charging method, a dividing addition method, a continuous dripping method, and the like.

Incidentally, a reducing agent such as sodium bisulfite, and a decomposing agent of the polymerization initiator such as a transition metal salt such as ferrous sulfate can be added to a reaction system in an appropriate amount, in order to promote the decomposition of the polymerization initiator.

In addition, a chain transfer agent can be used in order to adjust a weight average molecular weight of a polymer. The chain transfer agent includes, for example, 2-ethylhexyl thioglycolate, tert-dodecyl mercaptan, n-octyl mercaptan, n-dodecyl mercaptan, mercaptoacetic acid, mercaptopropionic acid, 2-mercaptoethanol, α-methylstyrene, α-methylstyrene dimer and the like, and the present invention is not limited only to those exemplified ones. These chain transfer agents can be used alone or in combination of two or more. It is preferred that the amount of the chain transfer agent per 100 parts by mass of the monomer component is 0.01 to 10 parts by mass from the viewpoint of adjustment of the weight average molecular weight of the polymer included in the polymer emulsion particles.

In addition, a silane coupling agent can be used in an appropriate amount from the viewpoint of improvement in weather resistance when emulsion polymerization of the monomer component is carried out. The silane coupling agent includes, for example, a silane coupling agent having a polymerizable unsaturated bond such as a (meth)acryloyl group, a vinyl group, an allyl group or a propenyl group, and the present invention is not limited only to those exemplified ones.

In addition, when an emulsion polymerization of the monomer component is carried out, an additive such as a chelating agent, a film-forming aid or a pH buffer can be added to the reaction system in an appropriate amount as occasion demands.

The atmosphere where the emulsion polymerization of the monomer component is carried out is not particularly limited, and is preferably an inert gas such as nitrogen gas or argon gas, from the viewpoint of enhancement of efficiency of the polymerization initiator.

The polymerization temperature in carrying out an emulsion polymerization of the monomer component is not particularly limited, and is usually preferably 50 to 100° C., and more preferably 60 to 85° C. The polymerization temperature can be constant or changed during the polymerization reaction.

The polymerization time of the monomer component is not particularly limited, and can be appropriately adjusted in accordance with the progress of the polymerization reaction. The polymerization time is usually 2 to 9 hours or so.

The polymer emulsion particles-containing aqueous dispersion of the present invention can be prepared by carrying out the emulsion-polymerization of the monomer component as described above.

The content of the polymer emulsion particles in the polymer emulsion particles-containing aqueous dispersion according to the present invention cannot be absolutely determined, because the content differs depending on uses of the polymer emulsion particles-containing aqueous dispersion. Therefore, it is preferred that the content of the polymer emulsion particles in the polymer emulsion particles-containing aqueous dispersion according to the present invention is appropriately adjusted in accordance with the uses of the polymer emulsion particles-containing aqueous dispersion.

The average particle diameter of the polymer emulsion particles included in the polymer emulsion particles-containing aqueous dispersion of the present invention is substantially the same as the average particle diameter of the monomer emulsion particles used as the raw material of the polymer emulsion particles-containing aqueous dispersion. Therefore, the average particle diameter of the monomer emulsion particles is maintained in the polymer emulsion particles-containing aqueous dispersion.

The average particle diameter of the polymer emulsion particles included in the polymer emulsion particles-containing aqueous dispersion according to the present invention is usually 10 to 200 nm, and preferably 10 to 150 nm. According to the method for producing the monomer emulsion particles-containing aqueous dispersion of the present invention, an aqueous dispersion which contains monomer emulsion particles having a very small particle size with an average particle diameter of 10 to 100 nm can be prepared as described above. Therefore, a polymer emulsion particles-containing aqueous dispersion which contains polymer emulsion particles having a very small particle size with an average particle diameter of 10 to 100 nm can be prepared. Incidentally, the average particle diameter of the polymer emulsion particles is a value as determined in accordance with a method described in the following Example 1.

[Polymer Emulsion Particles-Containing Aqueous Dispersion Having Resin Layer on its Surface]

The polymer emulsion particles-containing aqueous dispersion having a resin layer on its surface according to the present invention has a resin layer made by polymerization of a monomer component for forming a resin layer on the surface of the polymer emulsion particles. It can be expected that a film forming property of the polymer emulsion particles-containing aqueous dispersion is improved by forming a resin layer on the surface of the polymer emulsion particles.

The polymer emulsion particles-containing aqueous dispersion having a resin layer on its surface according to the present invention can be prepared by, for example, a method which includes adding a polymerization initiator, and an aqueous medium as occasion demands to the polymer emulsion particles-containing aqueous dispersion, and thereafter adding a component which is previously prepared by emulsifying a monomer component for forming a resin layer with an emulsifier and water thereto; a method which includes dissolving an emulsifier in the polymer emulsion particles-containing aqueous dispersion, and adding dropwise a monomer component for forming a resin layer and a polymerization initiator to the polymer emulsion particles-containing aqueous under stirring; a method which includes adding dropwise a component which is previously prepared by emulsifying a monomer component for forming a resin layer with an emulsifier and water to the polymer emulsion particles-containing aqueous dispersion; and the like. The present invention is not limited only to those methods. Incidentally, the amount of the aqueous medium can be appropriately determined in view of a content of nonvolatile components in the polymer emulsion particles-containing aqueous dispersion obtained.

The monomer component for forming the resin layer is a component for forming a resin layer on the surface of the polymer emulsion particles.

The monomer component for forming the resin layer includes a monofunctional monomer and a polyfunctional monomer. The monofunctional monomer and the polyfunctional monomer can be used alone or in combination thereof.

The monofunctional monomer includes, for example, an ethylenically unsaturated double bond-containing monomer, and the present invention is not limited only to the exemplified one.

The ethylenically unsaturated double bond-containing monomer includes, for example, an alkyl (meth)acrylate, an acid group-containing monomer, a hydroxyl group-containing (meth)acrylate, a piperidyl group-containing monomer, an oxo group-containing monomer, a fluorine atom-containing monomer, a nitrogen atom-containing monomer, an epoxy group-containing monomer, an alkoxyalkyl (meth) acrylate, a silane group-containing monomer, a carbonyl group-containing monomer, an aziridinyl group-containing monomer, a styrene monomer, an aralkyl (meth)acrylate and the like, and the present invention is not limited to those exemplified ones. These ethylenically unsaturated double bond-containing monomers can be used alone or in combination of two or more thereof.

The alkyl (meth)acrylate includes, for example, alkyl (meth)acrylates having an ester moiety of 1 to 18 carbon atoms, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, sec-butyl (meth)acrylate, 2-ethylhexyl (meth)acrylate, n-octyl (meth)acrylate, tridecyl (meth)acrylate, cyclohexyl (meth)acrylate, n-lauryl (meth)acrylate, dodecyl (meth)acrylate, stearyl (meth)acrylate and isobornyl methacrylate, and the like. The present invention is not limited only to those exemplified ones. These monomers can be used alone or in combination of two or more kinds thereof.

The acid group-containing monomer, the hydroxyl group-containing (meth)acrylate, the piperidyl group-containing monomer, the oxo group-containing monomer, the fluorine atom-containing monomer, the nitrogen atom-containing monomer, the epoxy group-containing monomer, the alkoxyalkyl (meth)acrylate, the silane group-containing monomer, the carbonyl group-containing monomer, the aziridinyl group-containing monomer, the styrene monomer, the aralkyl (meth)acrylate and the polyfunctional monomer include ones exemplified in the monomer X. These monomers can be used alone or in combination of two or more thereof.

It is preferred that an ultraviolet-stable monomer or an ultraviolet-absorbing monomer is included in the monomer component for forming the resin layer within a scope which would not hinder an object of the present invention, from the viewpoint of imparting of ultraviolet stability or ultraviolet absorptivity to the emulsion particles. When the ultraviolet absorptivity is imparted to the resin layer, the polymer emulsion particles-containing aqueous dispersion being excellent in film-forming property and weather resistance can be obtained.

The ultraviolet-stable monomer includes, for example, 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloyl-1-methoxy-2,2,6,6-tetramethylpiperidine, 4-cyano-4-(meth)acryloyloxy-2,2,6,6-tetramethylpiperidine, 1-(meth)acryloyl-4-(meth)acryloylamino-2,2,6,6-tetramethylpiperidine, 4-crotonoylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyl-4-crotonoyloxy-2,2,6,6-tetramethylpiperidine, 1-(meth)acryloyl-4-cyano-4-(meth)acryloylamino-2,2,6,6-tetramethylpiperidine, 1-crotonoyl-4-crotonoyloxy-2,2,6,6-tetramethylpiperidine and the like, and the present invention is not limited only to those exemplified ones. These monomers can be used alone or in combination of two or more kinds thereof. Among these ultraviolet-stable monomers, piperidyl group-containing (meth)acrylates such as 4-(meth)acryloyloxy-2,2,6,6-tetramethylpiperidine, 4-(meth)acryloyloxy-1,2,2,6,6-pentamethylpiperidine and 4-cyano-4-(meth)acryloyloxy-2,2,6,6-tetramethylpiperidine are preferable.

The ultraviolet-absorbing monomer includes, for example, a benzotriazole-based ultraviolet-absorbing monomer, a benzophenone-based ultraviolet-absorbing monomer and the like, and the present invention is not limited only to those exemplified ones. These monomers can be used alone or in combination of two or more kinds thereof.

The benzotriazole-based ultraviolet-absorbing monomer includes, for example, 2-[2'-hydroxy-5'-(meth)acryloyloxymethylphenyl]-2H-benzotriazole, 2-[2'-hydroxy-5'-(meth)acryloyloxyethylphenyl]-2H-benzotriazole, 2-[2'-hydroxy-5'-(meth)acryloyloxymethylphenyl]-5-tert-butyl-2H-benzotriazole, 2-[2'-hydroxy-5'-(meth)acryloylaminomethyl-5'-tert-octylphenyl]-2H-benzotriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-tert-butyl-5'-(meth)acryloyloxyethylphenyl]-2H-benzotriazole, 2-[2'-hydroxy-3'-tert-butyl-5'-(meth)acryloyloxyethylphenyl]-5-chloro-2H-benzotriazole, 2-[2'-hydroxy-5'-tert-butyl-3'-(meth)acryloyloxyethylphenyl]-2H-benzotriazole, 2-[2'-hydroxy-5'-(meth)acryloyloxyethylphenyl]-5-chloro-2H-benzotriazole, 2-[2'-hydroxy-5'-(meth)acryloyloxyethylphenyl]-5-cyano-2H-benzotriazole, 2-[2'-hydroxy-5'-(meth)acryloyloxyethylphenyl]-5-tert-butyl-2H-benzotriazole, 2-[2'-hydroxy-5'-(β-(meth)acryloyloxyethoxy)-3'-tert-butylphenyl]-4-tert-butyl-2H-benzotriazole and the like, and the present invention is not limited only to those exemplified ones. These monomers can be used alone or in combination of two or more kinds thereof.

The benzophenone-based ultraviolet-absorbing monomer includes, for example, 2-hydroxy-4-(meth)acryloyloxybenzophenone, 2-hydroxy-4-[2-hydroxy-3-(meth)acryloyloxy]propoxybenzophenone, 2-hydroxy-4-[2-(meth)acryloyloxy]ethoxybenzophenone, 2-hydroxy-4-[3-(meth)acryloyloxy-2-hydroxypropoxy]benzophenone, 2-hydroxy-3-tert-butyl-4-[2-(meth)acryloyloxy]butoxybenzophenone and the like, and the present invention is not limited only to those exemplified ones. These monomers can be used alone or in combination of two or more kinds thereof.

It is preferred that the content of the ultraviolet-stable monomer in the monomer component for forming the resin layer is 1 to 5% by mass from the viewpoint of improvement in ultraviolet stability and improvement in dispersion stability of the polymer emulsion particles-containing aqueous dispersion. In addition, it is preferred that the content of the ultraviolet-absorbing monomer in the monomer component for forming the resin layer is 1 to 5% by mass from the viewpoint of improvement in ultraviolet stability and improvement in dispersion stability of the polymer emulsion particles-containing aqueous dispersion.

The emulsifier includes the above-mentioned anionic emulsifier, the above-mentioned nonionic emulsifier, the above-mentioned cationic emulsifier, the above-mentioned amphoteric emulsifier, the above-mentioned polymer emulsifier and the like, and these emulsifiers can be used alone or in combination of two or more kinds thereof.

The amount of the emulsifier per 100 parts by mass of the monomer component for forming the resin layer is preferably 0.5 parts by mass or more, more preferably 1 part by mass or more, further preferably 2 parts by mass or more, and furthermore preferably 3 parts by mass or more, from the viewpoint of improvement in polymerization stability, and is preferably 10 parts by mass or less, more preferably 6 parts by mass or less, further preferably 5 parts by mass or less, and furthermore preferably 4 parts by mass or less, from the viewpoint of improvement in weather resistance.

The polymerization initiator includes, for example, azo compounds such as azobisisobutyronitrile, 2,2-azobis(2-methylbutyronitrile), 2,2-azobis(2,4-dimethylvaleronitrile), 2,2-azobis(2-diaminopropane) hydrochloride, 4,4-azobis(4-cyanovaleric acid) and 2,2-azobis(2-methylpropionamidine); persulfates such as ammonium persulfate and potassium persulfate; peroxides such as hydrogen peroxide, benzoyl peroxide, p-chlorobenzoyl peroxide, lauroyl peroxide and ammonium peroxide; and the like. The present invention is not limited only to those exemplified ones. These polymerization initiators can be used alone or in combination of two or more kinds thereof.

The amount of the polymerization initiator per 100 parts by mass of the monomer component for forming the resin layer is preferably 0.05 parts by mass or more, and more preferably 0.1 parts by mass or more, from the viewpoint of increase in a polymerization rate and reduction of a remaining amount of an unreacted monomer component, and is preferably 1 part by mass or less, and more preferably 0.5 parts by mass or less, from the viewpoint of improvement in weather resistance.

A method for adding the polymerization initiator to the monomer component for forming the resin layer is not particularly limited. The method includes, for example, a batch charging method, a dividing addition method, a continuous dripping method, and the like. In addition, a part of the polymerization initiator can be added to the reaction system before or after the monomer component for forming the resin layer is added to the reaction system, from the viewpoint of acceleration of termination of the polymerization reaction.

Incidentally, a reducing agent such as sodium bisulfite, and a decomposing agent of the polymerization initiator such as a transition metal salt such as ferrous sulfate can be added to the reaction system in an appropriate amount, in order to promote the decomposition of the polymerization initiator.

In addition, the above-mentioned chain transfer agent can also be used to adjust the weight average molecular weight of the polymer. It is preferred that the amount of the chain transfer agent per 100 parts by mass of the monomer component for forming the resin layer is 0.01 to 10 parts by mass from the viewpoint of adjustment of the weight average molecular weight of the polymer.

When the emulsion polymerization of the monomer component for forming the resin layer is carried out, a silane coupling agent can be added to the monomer component in an appropriate amount from the viewpoint of improvement in weather resistance of the polymer emulsion particles. The silane coupling agent includes, for example, a silane coupling agent having a polymerizable unsaturated bond such as a (meth)acryloyl group, a vinyl group, an allyl group or a propenyl group, and the like. The present invention is not limited only to those exemplified ones.

When the emulsion polymerization of the monomer component for forming the resin layer is carried out, an additive such as a chelating agent, a film-forming aid or a pH buffer can be added to the reaction system as occasion demands. The amount of the additive cannot be absolutely determined because the amount differs depending on its kind. The amount of the additive per 100 parts by mass of the monomer component for forming the resin layer is usually 0.01 to 5 parts by mass or so, more preferably 0.1 to 3 parts by mass or so.

The atmosphere where the emulsion polymerization of the monomer component is carried out is not particularly limited. It is preferred that the atmosphere is an inert gas such as nitrogen gas from the viewpoint of enhancement of efficiency of the polymerization initiator.

The polymerization temperature of the monomer component for forming the resin layer is not particularly limited. The polymerization temperature is usually preferably 50 to 100° C., and more preferably 60 to 85° C. The polymerization temperature can be constant or can be changed during the polymerization reaction.

The polymerization time for emulsion polymerization of the monomer component for forming the resin layer is not particularly limited, and the polymerization time can be appropriately adjusted in accordance with the progress of the polymerization reaction. The polymerization time is usually 2 to 9 hours or so.

A polymer emulsion particles-containing aqueous dispersion having a resin layer on its surface can be obtained by carrying out the emulsion polymerization of the monomer component for forming the resin layer as described above. The thickness of the resin layer formed on the surface of the polymer emulsion particle cannot be absolutely determined, because the thickness of the resin layer differs depending on uses of the polymer emulsion particles-containing aqueous dispersion having a resin layer on its surface. The thickness of the resin layer is usually 2 to 50 nm or so.

A mass ratio of the inner layer of the polymer emulsion particles having a resin layer on its surface and the surface resin layer [polymer constituting the inner layer/polymer constituting the surface resin layer] is usually preferably from 5/95 to 80/20, and more preferably from 10/90 to 75/25.

The polymer emulsion particles-containing aqueous dispersion according to the present invention may contain, for example, an additive within a range which would not hinder an object of the present invention. The additive includes those exemplified ones as described in the above. The amount of the additive cannot be absolutely determined, because the amount of the additive differs depending on the kind of the additive. Therefore, it is preferred that the amount of the additive is appropriately determined in accordance with the kind of the additive.

Incidentally, it is preferred that a black pigment or a black dye is used as the additive, and the black pigment or the black dye is included in the resin layer, from the viewpoint of improvement in weather resistance.

The content of a nonvolatile component in the polymer emulsion particles-containing aqueous dispersion is preferably 20% by mass or more, and more preferably 25% by mass or more, from the viewpoint of improvement in productivity, and is preferably 70% by mass or less, and more preferably 60% by mass or less, from the viewpoint of improvement in handleability. Therefore, the content of the nonvolatile component in the polymer emulsion particles-containing aqueous dispersion is preferably 20 to 70% by mass, and more preferably 25 to 60% by mass.

Incidentally, the content of the nonvolatile component in the aqueous resin dispersion described herein means a value as determined by weighing 1 g of the aqueous resin dispersion, drying the aqueous resin dispersion at a temperature of 110° C. for one hour in a hot air dryer, regarding the resulting residue as a nonvolatile component, and calculating the content of the nonvolatile component in accordance with the equation:

[Content of nonvolatile component (% by mass) in aqueous resin dispersion]=([Mass of residue]÷[1 g of aqueous resin dispersion])×100.

[Others]

A crosslinking property can be imparted to the polymer emulsion particles-containing aqueous dispersion and the polymer emulsion particles-containing aqueous dispersion having a resin layer on its surface according to the present invention by incorporating a crosslinking agent therein. The crosslinking agent can be one which initiates a crosslinking reaction at room temperature, or one which initiates a crosslinking reaction by heating. The crosslinking agent includes, for example, an oxazoline group-containing compound, an isocyanate group-containing compound, an aminoplast resin, and the like. These crosslinking agents can be used alone or in combination of two or more kinds thereof.

Incidentally, according to the present invention, in addition to the above-mentioned crosslinking agent, for example, a crosslinking agent such as a carbodiimide compound, or a polyvalent metal compound such as a zirconium compound, a zinc compound, a titanium compound or an aluminum compound can be used within a scope which would not hinder an object of the present invention.

In addition, for example, additives such as a film-forming aid, a plasticizer, a defoaming agent, a pigment, a thickener, a matting agent, a dispersant, a wetting agent, an ultraviolet absorbing agent, an ultraviolet stabilizing agent, a filler, a leveling agent, a stabilizer, a pigment, a dye and an antioxidant can be included in the polymer emulsion particles-containing aqueous dispersion and the polymer emulsion particles-containing aqueous dispersion having a resin layer on its surface according to the present invention within a scope which would not hinder an object of the present invention.

The polymer emulsion particles-containing aqueous dispersion and the polymer emulsion particles-containing aqueous dispersion having a resin layer on its surface according to the present invention can be suitably used, for example, in a water-based paint, respectively. The water-based paint contains the above-mentioned aqueous resin dispersion.

The water-based paint can be composed only of the aqueous resin dispersion, and may contain, for example, one or more kinds of a film-forming aid, a plasticizer, a defoaming agent, a thickener, a matting agent, a dispersant, a wetting agent, an ultraviolet absorbing agent, an ultraviolet stabilizing agent, a filler, a leveling agent, a stabilizer, a pigment, a dye, an antioxidant, and the like. The water-based paint includes, for example, an enamel paint, a clear paint, and the like.

The water-based paint can be solely coated to form one layer, or can be coated to form 2 or more layers by repeated coating. When the water-based paint is coated to form 2 or more layers by repeated coating, only one of the layers can be formed by the water-based paint, or all layers can be formed by the water-based paint. A method for repeated coating includes, for example, applying a paint for forming a first layer (for example, undercoat layer) to a substrate to which a primer treatment or a sealer treatment is applied, drying the resulting coating film, thereafter applying a paint for forming a second layer (for example, surface layer) to the coating film, and drying the resulting coating film, and the like. The present invention is not limited only to the method.

A method for applying the water-based paint includes, for example, a coating method using, for example, a brush, a bar coater, an applicator, an air spray, an airless spray, a roll coater or a flow coater, and the like. The present invention is not limited only to those exemplified ones.

The water-based paint can be suitably used when the water-based paint is applied to, for example, an exterior wall of a building, a vehicle body of an automobile and the like. The water-based paint also can be suitably applied to an inorganic building material such as a ceramic building material. The ceramic building material includes, for example, a tile, an outer wall material and the like. The ceramic building material is obtained by adding an inorganic filler, a fibrous material or the like to a hydraulic agglutination material as a raw material for an inorganic hardened body, molding the resulting mixture, and aging and curing the resulting molded body. The inorganic building material which is used for an exterior of a building includes, for example, a flexible board, a calcium silicate plate, a gypsum slag perlite plate, a wood chip cement board, a precast concrete plate, an ALC plate, a gypsum board, and the like.

EXAMPLES

Next, the present invention will be more specifically described based on working examples, and the present invention is not limited only to the working examples.

Incidentally, in the following working examples and comparative examples, the term "part(s)" means "part(s) by mass", and the term "%" means "% by mass" unless otherwise noted.

In the following working examples and comparative examples, the abbreviation of each compound means the following compound.

MMA: methyl methacrylate
BMA: n-butyl methacrylate
IBMA: isobutyl methacrylate
EHA: 2-ethylhexyl acrylate
EHMA: 2-ethylhexyl methacrylate
CHMA: cyclohexyl methacrylate
St: styrene
LMA: lauryl methacrylate
CTA: triallyl cyanurate
1,6HXA: 1,6-hexanediol diacrylate
KBM-503: methacryloxypropyltrimethoxysilane
SMA: stearyl methacrylate
C22MA: behenyl methacrylate
C22A: behenyl acrylate
DTDMA: decyltetradecyl methacrylate
EHC: hexadecyl 2-ethylhexanoate
SS: stearyl stearate
CS-12: 2,2,4-trimethyl-1,3-pentanediol monoisobutyrate
HEMA: 2-hydroxyethyl methacrylate

Example 1

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 12.5 parts of CHMA, 4.5 parts of EHC and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in accordance with the following method. As a result, the phase inversion temperature was from 75° C. (the lower limit of the temperature was a phase inversion-initiating temperature, hereinafter referred to the same) to 88° C. (the upper limit of the temperature was a phase inversion-terminating temperature, hereinafter referred to the same).

[Method for Determining Phase Inversion Temperature]

A 2-liter reaction vessel equipped with a stirring device and a temperature sensor was charged with 1000 g of the above-mentioned mixture, and the mixture was stirred.

While a temperature of the reaction vessel was raised with a water bath, an electrical conductivity of the mixture was determined by using an electrical conductivity meter [trade name: Lacom Tester PC450 commercially available from EUTEC LTD.] every time the temperature of the mixture in the reaction vessel raised by 1° C.

The electrical conductivity when the temperature was raised was plotted by every temperature. A temperature at which continuous lowering of the electric conductivity initiates with increase of the temperature was defined as the phase inversion-initiating temperature, and a temperature at which the electric conductivity became 1.00 μS or lower was defined as the phase inversion-terminating temperature.

Incidentally, if the electric conductivity did not fall below 1.00 μS when the temperature of the conductivity meter exceeded the upper limit of the measurable temperature, a temperature at which the appearance of the mixture did not change even after 3 minutes had passed after reaching a temperature higher than the phase inversion-initiating temperature under stirring was defined as a temperature at the end point of the phase inversion.

After the phase inversion temperature of the mixture was measured, the reaction vessel was heated with a water bath under stirring while nitrogen gas was introduced into the reaction vessel.

After the temperature of the mixture in the reaction vessel reached 90° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in accordance with the following methods. The results are shown in Table 1.

(1) Dispersion Stability

A dispersion state of the monomer emulsion particles after allowing to stand the monomer emulsion particles-containing aqueous dispersion at room temperature (about 25° C.) for 12 hours, and a dispersion state of the monomer emulsion particles after allowing to stand the monomer emulsion particles-containing aqueous dispersion at room temperature (about 25° C.) for 14 days were observed with naked eyes, respectively, and the dispersion stability of the monomer emulsion particles-containing aqueous dispersion was evaluated on the basis of the following evaluation criteria.

[Evaluation Criteria]

○: No precipitation of the monomer emulsion particles and no separation of the monomer component and an aqueous media are observed.

x: At least one of precipitation of the monomer emulsion particles and separation of the monomer component and the aqueous medium is observed.

(2) Average Particle Diameter

An average particle diameter of the monomer emulsion particles just after preparation of the monomer emulsion particles-containing aqueous dispersion (hereinafter simply referred to as "average particle diameter") and an average particle diameter of the monomer emulsion particles after 14 days passed from the preparation of monomer emulsion particles-containing aqueous dispersion were determined in accordance with a Cumulant analysis method by using a multi-specimen nanoparticle diameter measurement system [trade name: nanoSAQRA commercially available from Otsuka Electronics Co., Ltd.].

Next, a reaction vessel was charged with 100 parts of the monomer emulsion particles-containing aqueous dispersion obtained in the above, and 2.4 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 0.9 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 62 nm.

Example 2

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 12 parts of CHMA, 5 parts of SMA and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 92° C.

After the phase inversion temperature of the mixture was measured, the reaction vessel was heated with a water bath under stirring while nitrogen gas was introduced into the reaction vessel.

After the internal temperature of the reaction vessel reached 95° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 3

The same procedures as in Example 2 were carried out, except that the amount of CHMA was changed to 9 parts, the amount of SMA was changed to 9 parts, and the amount of the ultraviolet absorbing agent was changed to 2 parts in Example 2, and thereby a monomer emulsion particles-containing aqueous dispersion was obtained. Incidentally, the phase inversion temperature of the mixture charged in the reaction vessel was determined in the same manner as in Example 1. As a result, the phase inversion temperature was from 80° C. to 94° C.

The dispersion stability of the monomer emulsion particles-containing aqueous dispersion obtained in the above and an average particle diameter of the monomer emulsion particles were determined in the same manner as in Example 1. The results are shown in Table 1.

Example 4

A reaction vessel equipped with a stirring device, a temperature sensor, a cooling pipe, a conduit for introducing nitrogen and a dropping funnel was charged with 67.2 parts of deionized water, 9.6 parts of a polyoxyalkylene alkenyl ether [trade name: LATEMUL PD-420 commercially available from Kao Corporation, HLB: 12.6] as a nonionic emulsifier, 14.4 parts of CHMA, 4.8 parts of EHC and 4 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 5

A reaction vessel equipped with a stirring device, a temperature sensor, a cooling pipe, a conduit for introducing nitrogen and a dropping funnel was charged with 65 parts of deionized water, 7.5 parts of a polyoxyalkylene alkenyl ether [trade name: LATEMUL PD-420 commercially available from Kao Corporation, HLB: 12.6] as a nonionic emulsifier, 17 parts of CHMA, 7.5 parts of C22MA and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 75° C. to 88° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of monomer emulsion particles-containing aqueous dispersion obtained in the above and an average particle diameter of the monomer emulsion particles were determined in the same manner as in Example 1. The results are shown in Table 1.

Example 6

The same procedures as in Example 5 were carried out, except that the amount of the deionized water was changed to 60.0 parts, the amount of the nonionic emulsifier was changed to 13.3 parts, the amount of CHMA was changed to 16.6 parts, and the amount of C22MA was changed to 7.1 parts in Example 5, and thereby a monomer emulsion particles-containing aqueous dispersion was obtained. Incidentally, the phase inversion temperature of the mixture charged in the reaction vessel was determined in the same manner as in Example 1. As a result, the phase inversion temperature was from 75° C. to 88° C.

The dispersion stability of the monomer emulsion particles-containing aqueous dispersion obtained in the above and an average particle diameter of the monomer emulsion particles were determined in the same manner as in Example 1. The results are shown in Table 1.

Example 7

The same procedures as in Example 5 were carried out, except that the amount of the nonionic emulsifier was changed to 10 parts, the amount of CHMA was changed to 15 parts, and the amount of C22MA was changed to 7 parts in Example 5, and thereby a monomer emulsion particles-containing aqueous dispersion was obtained. Incidentally, the phase inversion temperature of the mixture charged in the reaction vessel was determined in the same manner as in Example 1. As a result, the phase inversion temperature was from 75° C. to 88° C.

The dispersion stability of the monomer emulsion particles-containing aqueous dispersion obtained in the above and an average particle diameter of the monomer emulsion particles were determined in the same manner as in Example 1. The results are shown in Table 1.

Next, a reaction vessel was charged with 100 parts of the monomer emulsion particles-containing aqueous dispersion obtained in the above, and 2.8 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 74 nm.

Example 8

A reaction vessel equipped with a stirring device, a temperature sensor, a cooling pipe, a conduit for introducing nitrogen and a dropping funnel was charged with 70 parts of deionized water, 7.5 parts of a polyoxyalkylene alkenyl ether [trade name: LATEMUL PD-420 commercially available from Kao Corporation, HLB: 12.6] as a nonionic emulsifier, 13 parts of CHMA, 2.5 parts of EHMA, 4 parts of EHC and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 9

A reaction vessel equipped with a stirring device, a temperature sensor, a cooling pipe, a conduit for introducing nitrogen and a dropping funnel was charged with 65 parts of deionized water, 10 parts of a polyoxyalkylene alkenyl ether [trade name: LATEMUL PD-420 commercially available from Kao Corporation, HLB: 12.6] as a nonionic emulsifier, 16.1 parts of CHMA, 5.4 parts of EHC, 1.5 parts of an ultraviolet absorbing agent [trade name: Tinuvin (registered trademark) 400 commercially available from BASF SE], 1.5 parts of a hindered amine light stabilizer [trade name: ADK STAB LA-87 commercially available from ADEKA CORPORATION] and 0.5 parts of a phthalocyanine near infrared absorption dye represented by the formula (I):

[Chem. 1]

(I)

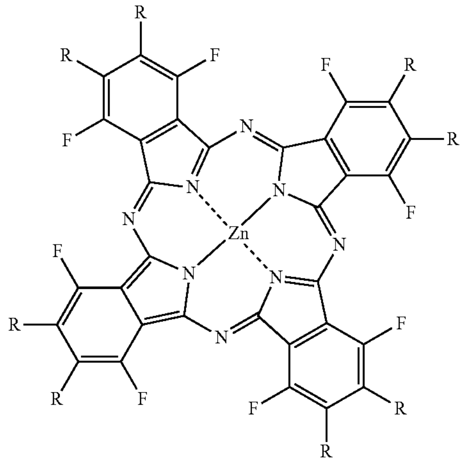

wherein each of R represents the formula:

[Chem. 2]

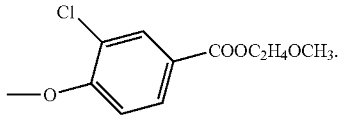

A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 10

A reaction vessel equipped with a stirring device, a temperature sensor, a cooling pipe, a conduit for introducing nitrogen and a dropping funnel was charged with 65 parts of deionized water, 10 parts of a polyoxyalkylene alkenyl ether [trade name: LATEMUL PD-420 commercially available from Kao Corporation, HLB: 12.6] as a nonionic emulsifier, 14.7 parts of CHMA, 6.8 parts of C22MA, 1.4 parts of an ultraviolet absorbing agent [trade name: Tinuvin (registered trademark) 400 commercially available from BASF SE], 1.4 parts of a hindered amine light stabilizer [trade name: ADK STAB LA-87 commercially available from ADEKA CORPORATION] and 0.7 parts of a phthalocyanine near infrared absorption dye represented by the formula (I). A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 11

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 14.8 parts of CHMA, 5 parts of EHC and 0.2 parts of a phthalocyanine near infrared absorption dye represented by the formula (I). A part of the resulting mixture was taken out from the reaction vessel, and a phase inversion temperature of the mixture was determined in the same manner as in Example 1. As a result, the phase inversion temperature was from 75° C. to 88° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Next, a reaction vessel was charged with 100 parts of the monomer emulsion particles-containing aqueous dispersion obtained in the above, and 2.4 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 0.9 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 59 nm.

Example 12

A reaction vessel equipped with a stirring device, a temperature sensor, a cooling pipe, a conduit for introducing nitrogen and a dropping funnel was charged with 67 parts of deionized water, 10 parts of a polyoxyalkylene alkenyl ether [trade name: LATEMUL PD-420 commercially available from Kao Corporation, HLB: 12.6] as a nonionic emulsifier, 14 parts of CHMA, 6 parts of C22A6 and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 13

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 12 parts of CHMA, 5 parts of DTDMA and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 78° C. to 90° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 14

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 13 parts of CHMA, 4 parts of SS and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 94° C.

After the phase inversion temperature of the mixture was measured, the reaction vessel was heated with a water bath under stirring while nitrogen gas was introduced into the reaction vessel.

After the internal temperature of the reaction vessel reached 95° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 15

A reaction vessel equipped with a stirring device, a temperature sensor, a cooling pipe, a conduit for introducing nitrogen and a dropping funnel was charged with 67 parts of deionized water, 10 parts of a polyoxyalkylene alkenyl ether [trade name: LATEMUL PD-420 commercially available from Kao Corporation, HLB: 12.6] as a nonionic emulsifier, 3.99 parts of BMA, 12 parts of CHMA, 5 parts of EHC, 2 parts of an ultraviolet absorbing agent [trade name: Tinuvin (registered trademark) 400 commercially available from BASF SE] and 0.01 parts of a red dye [trade name: Sumiplast Red HL2B commercially available from Sumika Chemtex Co., Ltd.]. A part of the resulting mixture was taken out from the reaction vessel, and a phase inversion temperature of the mixture was determined in the same manner as in Example 1. As a result, the phase inversion temperature was from 75° C. to 88° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 16

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 4 parts of IBMA, 8 parts of CHMA, 5 parts of EHC and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 75° C. to 88° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 17

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 12 parts of EHMA, 4 parts of EHC and 4 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 94° C.

After the phase inversion temperature of the mixture was measured, the reaction vessel was heated with a water bath under stirring while nitrogen gas was introduced into the reaction vessel.

After the internal temperature of the reaction vessel reached 95° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 18

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 3 parts of MMA, 9 parts of CHMA, 7 parts of EHC and 1 part of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 91° C.

After the phase inversion temperature of the mixture was measured, the reaction vessel was heated with a water bath under stirring while nitrogen gas was introduced into the reaction vessel.

After the internal temperature of the reaction vessel reached 93° C., the reaction vessel was taken out from the water bath, and air-cooled down under stirring until an internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 19

A reaction vessel equipped with a stirring device, a temperature sensor, a cooling pipe, a conduit for introducing nitrogen and a dropping funnel was charged with 69 parts of deionized water, 9.9 parts of a sec-alcohol ethoxylate [trade name: SOFTANOL 120 commercially available from NIPPON SHOKUBAI CO., LTD, HLB: 14.5] as a nonionic emulsifier, 9.9 parts of St, 9.9 parts of SMA and 1.3 parts of an ultraviolet absorbing agent [trade name: Tinuvin (registered trademark) 400 BASF SE]. A part of the resulting mixture was taken out from the reaction vessel, and a phase inversion temperature of the mixture was determined in the same manner as in Example 1. As a result, the phase inversion temperature was from 50° C. to 56° C.

After the phase inversion temperature of the mixture was measured, the reaction vessel was heated with a water bath under stirring while nitrogen gas was introduced into the reaction vessel.

After the internal temperature of the reaction vessel reached 57° C., the reaction vessel was taken out from the water bath, and put into an ice bath to cool the reaction vessel to an internal temperature of 10° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 20

A reaction vessel equipped with a stirring device, a temperature sensor, a cooling pipe, a conduit for introducing nitrogen and a dropping funnel was charged with 70 parts of deionized water, 10 parts of a nonionic emulsifier [trade name: ADEKA REASOAP ER-10 commercially available from ADEKA CORPORATION, HLB: 12.1], 15.5 parts of CHMA, 1.5 parts of EHC and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 52° C. to 63° C.

After the phase inversion temperature of the mixture was measured, the reaction vessel was heated with a water bath under stirring while nitrogen gas was introduced into the reaction vessel.

After the internal temperature of the reaction vessel reached 65° C., the reaction vessel was taken out from the water bath, and put into an ice bath to cool the reaction vessel. When the internal temperature of the reaction vessel reached 10° C., 2.4 parts of a 25% aqueous solution of an anionic emulsifier [trade name: ADEKA REASOAP SR-20 commercially available from ADEKA CORPORATION], and the contents in the reaction vessel were stirred for 20 minutes while the contents were cooled to 10° C., to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 1.

Example 21

A reaction vessel equipped with a stirring device, a temperature sensor, a cooling pipe, a conduit for introducing nitrogen and a dropping funnel was charged with 70 parts of deionized water, 10.9 parts of a polyoxyalkylene alkenyl ether [trade name: LATEMUL PD-420 commercially available from Kao Corporation, HLB: 12.6] as a nonionic emulsifier, 3.0 parts of MMA, 7.0 parts of CHMA, 4.1 parts of EHC and 8.0 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 84° C. to 89° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.0 part of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 57 nm.

Example 22

A reaction vessel equipped with a stirring device, a temperature sensor, a cooling pipe, a conduit for introducing nitrogen and a dropping funnel was charged with 70 parts of deionized water, 12.3 parts of a polyoxyalkylene alkenyl ether [trade name: LATEMUL PD-420 commercially available from Kao Corporation, HLB: 12.6] as a nonionic emulsifier, 3.5 parts of MMA, 13.8 parts of CHMA, 5.0 parts of EHC, 0.8 parts of an oil-soluble ultraviolet absorbing agent [trade name: RUVA-93 commercially available from Otsuka Chemical Co., Ltd.], and 1.6 parts of an oil-soluble azo red dye [trade name: Oil Color Red TR-71 commercially available from CHUO SYNTHETIC CHEMICAL CO., LTD.]. A part of the resulting mixture was taken out from the reaction vessel, and a phase inversion temperature of the mixture was determined in the same manner as in Example 1. As a result, the phase inversion temperature was from 75° C. to 83° C.

After the phase inversion temperature of the mixture was measured, the reaction vessel was heated with a water bath under stirring while nitrogen gas was introduced into the reaction vessel.

After the internal temperature of the reaction vessel reached 85° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 3.0 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 47 nm.

Example 23

A reaction vessel equipped with a stirring device, a temperature sensor, a cooling pipe, a conduit for introducing nitrogen and a dropping funnel was charged with 70 parts of deionized water, 11.5 parts of a polyoxyalkylene alkenyl ether [trade name: LATEMUL PD-420 commercially available from Kao Corporation, HLB: 12.6] as a nonionic emulsifier, 3.1 parts of MMA, 5.5 parts of EHA, 5.8 parts of CHMA, 2.0 parts of CTA, 0.5 parts of KBM-503, 4.4 parts of EHC, 0.7 parts of an oil-soluble ultraviolet absorbing agent [trade name: RUVA-93 commercially available from Otsuka Chemical Co., Ltd.], and 1.5 parts of an oil-soluble azo red dye [trade name: Oil Color Red TR-71 commercially available from CHUO SYNTHETIC CHEMICAL CO., LTD.]. A part of the resulting mixture was taken out from the reaction vessel, and a phase inversion temperature of the mixture was determined in the same manner as in Example 1. As a result, the phase inversion temperature was from 79° C. to 81° C.

After the phase inversion temperature of the mixture was measured, the reaction vessel was heated with a water bath under stirring while nitrogen gas was introduced into the reaction vessel.

After the internal temperature of the reaction vessel reached 83° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.8 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 42 nm.

Example 24

A reaction vessel equipped with a stirring device, a temperature sensor, a cooling pipe, a conduit for introducing nitrogen and a dropping funnel was charged with 70 parts of deionized water, 12.3 parts of a polyoxyalkylene alkenyl ether [trade name: LATEMUL PD-420 commercially available from Kao Corporation, HLB: 12.6] as a nonionic emulsifier, 3.5 parts of MMA, 13.8 parts of CHMA, 5.0 parts of EHC, 0.8 parts of an oil-soluble ultraviolet absorbing agent [trade name: RUVA-93 commercially available from Otsuka Chemical Co., Ltd.], and 1.6 parts of an oil-soluble chromium complex salt red dye. A part of the resulting mixture was taken out from the reaction vessel, and a phase inversion temperature of the mixture was determined in the same manner as in Example 1. As a result, the phase inversion temperature was from 79° C. to 85° C.

After the phase inversion temperature of the mixture was measured, the reaction vessel was heated with a water bath under stirring while nitrogen gas was introduced into the reaction vessel.

After the internal temperature of the reaction vessel reached 87° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 3.0 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 50 nm.

Example 25

A reaction vessel equipped with a stirring device, a temperature sensor, a cooling pipe, a conduit for introducing nitrogen and a dropping funnel was charged with 70 parts of deionized water, 11.5 parts of a polyoxyalkylene alkenyl ether [trade name: LATEMUL PD-420 commercially available from Kao Corporation, HLB: 12.6] as a nonionic emulsifier, 3.1 parts of MMA, 5.5 parts of EHA, 5.8 parts of CHMA, 2.0 parts of CTA, 4.4 parts of EHC, 0.7 parts of an oil-soluble ultraviolet absorbing agent [trade name: RUVA-93 commercially available from Otsuka Chemical Co., Ltd.], and 1.5 parts of an oil-soluble chromium complex salt red dye. A part of the resulting mixture was taken out from the reaction vessel, and a phase inversion temperature of the mixture was determined in the same manner as in Example 1. As a result, the phase inversion temperature was from 79° C. to 81° C.

After the phase inversion temperature of the mixture was measured, the reaction vessel was heated with a water bath under stirring while nitrogen gas was introduced into the reaction vessel.

After the internal temperature of the reaction vessel reached 83° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.8 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 41 nm.

Example 26

A reaction vessel equipped with a stirring device, a temperature sensor, a cooling pipe, a conduit for introducing nitrogen and a dropping funnel was charged with 70 parts of deionized water, 12.3 parts of a polyoxyalkylene alkenyl ether [trade name: LATEMUL PD-420 commercially available from Kao Corporation, HLB: 12.6] as a nonionic emulsifier, 3.5 parts of MMA, 11.8 parts of CHMA, 7.0 parts of EHC, 0.8 parts of an oil-soluble ultraviolet absorbing agent [trade name: RUVA-93 commercially available from Otsuka Chemical Co., Ltd.], and 1.6 parts of an oil-soluble chromium complex salt red dye. A part of the resulting mixture was taken out from the reaction vessel, and a phase inversion temperature of the mixture was determined in the same manner as in Example 1. As a result, the phase inversion temperature was from 86° C. to 91° C.

After the phase inversion temperature of the mixture was measured, the reaction vessel was heated with a water bath under stirring while nitrogen gas was introduced into the reaction vessel.

After the internal temperature of the reaction vessel reached 93° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 3.0 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 1.1 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 48 nm.

Example 27

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 1 part of MMA, 6.8 parts of CHMA, 4.2 parts of EHC, and 8 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 94° C.

After the phase inversion temperature of the mixture was measured, the reaction vessel was heated with a water bath under stirring while nitrogen gas was introduced into the reaction vessel.

After the internal temperature of the reaction vessel reached 95° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.4 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 80° C.

Thereafter, 0.9 parts of a 5% aqueous solution of potassium persulfate was added to the reaction vessel, and the contents in the reaction vessel were heated at 80° C. for 6 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 80 nm.

Example 28

A reaction vessel equipped with a stirring device, a temperature sensor, a cooling pipe, a conduit for introducing nitrogen and a dropping funnel was charged with 67 parts of deionized water, 10.9 parts of a polyoxyalkylene alkenyl ether [trade name: LATEMUL PD-420 commercially available from Kao Corporation, HLB: 12.6] as a nonionic emulsifier, 3.0 parts of MMA, 7.0 parts of CHMA, 0.4 parts of St, 1.6 parts of 1,6HXA, 4.1 parts of EHC, 3.0 parts of an ultraviolet absorbing agent [trade name: Tinuvin (registered trademark) 400 commercially available from BASF SE], 3.0 parts of an ultraviolet absorbing agent [trade name: Tinuvin (registered trademark) 479 commercially available from BASF SE], 0.3 parts of a hindered amine light stabilizer [trade name: ADK STAB LA-87 commercially available from ADEKA CORPORATION], and 1.0 part of an oil-soluble chromium complex salt red dye. A part of the resulting mixture was taken out from the reaction vessel, and a phase inversion temperature of the mixture was determined in the same manner as in Example 1. As a result, the phase inversion temperature was from 76° C. to 83° C.

After the phase inversion temperature of the mixture was measured, the reaction vessel was heated with a water bath under stirring while nitrogen gas was introduced into the reaction vessel.

After the internal temperature of the reaction vessel reached 86° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 0.9 parts of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 51 nm.

Example 29

A reaction vessel equipped with a stirring device, a temperature sensor, a cooling pipe, a conduit for introducing nitrogen and a dropping funnel was charged with 67 parts of deionized water, 10.8 parts of a polyoxyalkylene alkenyl ether [trade name: LATEMUL PD-420 commercially available from Kao Corporation, HLB: 12.6] as a nonionic emulsifier, 3.0 parts of MMA, 10.4 parts of CHMA, 0.6 parts of 1,6HXA, 0.7 parts of KBM-503, 3.5 parts of EHC, 2.6 parts of an ultraviolet absorbing agent [trade name: Tinuvin (registered trademark) 400 commercially available from BASF SE], 1.3 parts of an oil-soluble azo red dye, and 0.1 parts of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 75° C. to 79° C.

After the phase inversion temperature of the mixture was measured, the reaction vessel was heated with a water bath under stirring while nitrogen gas was introduced into the reaction vessel.

After the internal temperature of the reaction vessel reached 83° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 0.9 parts of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 53 nm.

Example 30

A reaction vessel equipped with a stirring device, a temperature sensor, a cooling pipe, a conduit for introducing nitrogen and a dropping funnel was charged with 67 parts of deionized water, 10.8 parts of a polyoxyalkylene alkenyl ether [trade name: LATEMUL PD-420 commercially available from Kao Corporation, HLB: 12.6] as a nonionic emulsifier, 3.0 parts of MMA, 11.6 parts of CHMA, 0.3 parts of 1,6HXA, 1.1 parts of C22A, 3.3 parts of CS-12, 1.6 parts of an ultraviolet absorbing agent [trade name: Tinuvin (registered trademark) 479 commercially available from BASF SE], 0.3 parts of a hindered amine light stabilizer [trade name: ADK STAB LA-87 commercially available from ADEKA CORPORATION], and 1.0 part of an oil-soluble chromium complex salt red dye. A part of the resulting mixture was taken out from the reaction vessel, and a phase inversion temperature of the mixture was determined in the same manner as in Example 1. As a result, the phase inversion temperature was from 67° C. to 84° C.

After the phase inversion temperature of the mixture was measured, the reaction vessel was heated with a water bath under stirring while nitrogen gas was introduced into the reaction vessel.

After the internal temperature of the reaction vessel reached 86° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 70° C.

After 0.9 parts of a 5% aqueous solution of potassium persulfate was added to the reaction vessel, the contents in the reaction vessel were reacted at 70° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 41 nm.

Example 31

A reaction vessel equipped with a stirring device, a temperature sensor, a cooling pipe, a conduit for introducing nitrogen and a dropping funnel was charged with 64 parts of deionized water, 10.8 parts of a polyoxyalkylene alkenyl ether [trade name: LATEMUL PD-420 commercially available from Kao Corporation, HLB: 12.6] as a nonionic emulsifier, 3.0 parts of MMA, 9.9 parts of CHMA, 1.5 parts of St, 0.3 parts of 1,6HXA, 4.2 parts of EHC, 2.0 parts of an ultraviolet absorbing agent [trade name: Tinuvin (registered trademark) 400 commercially available from BASF SE], 2.0 parts of an ultraviolet absorbing agent [trade name: Tinuvin (registered trademark) 479 commercially available from BASF SE], 0.5 parts of an ultraviolet absorbing agent [trade name: Tinuvin (registered trademark) 970 commercially available from BASF SE], 0.4 parts of an oil-soluble ultraviolet absorbing agent [trade name: ADK STAB LA-F70 commercially available from ADEKA CORPORATION], 0.3 pats of a hindered amine light stabilizer [trade name: ADEKA STAB LA-87 commercially available from ADEKA CORPORATION], and 1.0 part of an oil-soluble chromium complex salt red dye. A part of the resulting mixture was taken out from the reaction vessel, and a phase inversion temperature of the mixture was determined in the same manner as in Example 1. As a result, the phase inversion temperature was from 72° C. to 81° C.

After the phase inversion temperature of the mixture was measured, the reaction vessel was heated with a water bath under stirring while nitrogen gas was introduced into the reaction vessel.

After the internal temperature of the reaction vessel reached 85° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.9 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 1.0 part of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 49 nm.

Example 32

A reaction vessel equipped with a stirring device, a temperature sensor, a cooling pipe, a conduit for introducing nitrogen and a dropping funnel was charged with 67 parts of deionized water, 9.5 parts of a polyoxyalkylene alkenyl ether [trade name: LATEMUL PD-420 commercially available from Kao Corporation, HLB: 12.6] as a nonionic emulsifier, 3.0 parts of MMA, 12.0 parts of CHMA, 0.9 parts of St, 0.3 parts of 1,6HXA, 1.1 parts of C22A, 3.3 parts of CS-12, 1.0 part of an ultraviolet absorbing agent [trade name: Tinuvin (registered trademark) 479 commercially available from BASF SE], 0.3 parts of an oil-soluble ultraviolet absorbing agent [trade name: RUVA-93 commercially available from Otsuka Chemical Co., Ltd.], 0.3 parts of a hindered amine light stabilizer [trade name: ADK STAB LA-87 commercially available from ADEKA CORPORATION], 1.0 part of an oil-soluble chromium complex salt red dye, and 0.3 parts of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 82° C. to 88° C.

After the phase inversion temperature of the mixture was measured, the reaction vessel was heated with a water bath under stirring while nitrogen gas was introduced into the reaction vessel.

After the internal temperature of the reaction vessel reached 85° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.9 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 1.0 part of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 56 nm.

Example 33

A reaction vessel equipped with a stirring device, a temperature sensor, a cooling pipe, a conduit for introducing nitrogen and a dropping funnel was charged with 67 parts of deionized water, 10.8 parts of a polyoxyalkylene alkenyl ether [trade name: LATEMUL PD-420 commercially available from Kao Corporation, HLB: 12.6] as a nonionic emulsifier, 1.0 part of MMA, 10.2 parts of CHMA, 3.8 parts of St, 0.3 parts of 1,6HXA, 4.5 parts of EHC, 1.5 parts of an ultraviolet absorbing agent [trade name: Tinuvin (registered trademark) 479 commercially available from BASF SE], 0.4 parts of a hindered amine light stabilizer [trade name: ADK STAB LA-87 commercially available from ADEKA CORPORATION], and 0.5 parts of an oil-soluble blue dye [trade name: KP Plast Blue R commercially available from KIWA Chemical Industry Co., Ltd.]. A part of the resulting mixture was taken out from the reaction vessel, and a phase inversion temperature of the mixture was determined in the same manner as in Example 1. As a result, the phase inversion temperature was from 73° C. to 82° C.

After the phase inversion temperature of the mixture was measured, the reaction vessel was heated with a water bath under stirring while nitrogen gas was introduced into the reaction vessel.

After the internal temperature of the reaction vessel reached 85° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 0.9 parts of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 53 nm.

Example 34

A reaction vessel equipped with a stirring device, a temperature sensor, a cooling pipe, a conduit for introducing nitrogen and a dropping funnel was charged with 66 parts of deionized water, 9.9 parts of a polyoxyalkylene alkenyl ether [trade name: LATEMUL PD-420 commercially available from Kao Corporation, HLB: 12.6] as a nonionic emulsifier, 2.0 parts of MMA, 10.2 parts of CHMA, 3.8 parts of St, 0.3 parts of 1,6HXA, 5.0 parts of C22A, 1.5 parts of an ultraviolet absorbing agent [trade name: Tinuvin (registered trademark) 479 commercially available from BASF SE], 0.4 parts of a hindered amine light stabilizer [trade name: ADK STAB LA-87 commercially available from ADEKA CORPORATION], 0.5 parts of an oil-soluble blue dye [trade name: KP Plast Blue R commercially available from KIWA Chemical Industry Co., Ltd.], and 0.4 parts of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 77° C. to 88° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.9 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 1.0 part of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 64 nm.

Example 35

A reaction vessel equipped with a stirring device, a temperature sensor, a cooling pipe, a conduit for introducing nitrogen and a dropping funnel was charged with 66 parts of deionized water, 10.9 parts of a polyoxyalkylene alkenyl ether [trade name: LATEMUL PD-420 commercially available from Kao Corporation, HLB: 12.6] as a nonionic emulsifier, 3.0 parts of MMA, 9.0 parts of CHMA, 0.4 parts of St, 0.3 parts of 1,6HXA, 4.1 parts of EHC, 3.0 parts of an ultraviolet absorbing agent [trade name: Tinuvin (registered trademark) 479 commercially available from BASF SE], 1.0 part of an ultraviolet absorbing agent [trade name: Tinuvin (registered trademark) 970 commercially available from BASF SE], 0.3 parts of a hindered amine light stabilizer [trade name: ADK STAB LA-87 commercially available from ADEKA CORPORATION], and 1.0 part of an oil-soluble yellow dye [trade name: Oil Yellow 5GS Extra commercially available from SHIRADO CHEMICAL WORKS, Ltd.]. A part of the resulting mixture was taken out from the reaction vessel, and a phase inversion temperature of the mixture was determined in the same manner as in Example 1. As a result, the phase inversion temperature was from 74° C. to 83° C.

After the phase inversion temperature of the mixture was measured, the reaction vessel was heated with a water bath under stirring while nitrogen gas was introduced into the reaction vessel.

After the internal temperature of the reaction vessel reached 87° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 72° C.

After 0.9 parts of a 5% aqueous solution of potassium persulfate was added to the reaction vessel, the contents in the reaction vessel were reacted at 72° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 49 nm.

Example 36

A reaction vessel equipped with a stirring device, a temperature sensor, a cooling pipe, a conduit for introducing nitrogen and a dropping funnel was charged with 67 parts of deionized water, 10.8 parts of a polyoxyalkylene alkenyl ether [trade name: LATEMUL PD-420 commercially available from Kao Corporation, HLB: 12.6] as a nonionic emulsifier, 2.8 parts of MMA, 11.8 parts of CHMA, 0.3 parts of 1,6HXA, 4.4 parts of EHC, 1.0 part of an ultraviolet absorbing agent [trade name: Tinuvin (registered trademark) 400 commercially available from BASF SE], 0.3 parts of an oil-soluble ultraviolet absorbing agent [trade name: ADK STAB LA-F70 commercially available from ADEKA CORPORATION], 0.6 parts of a hindered amine light stabilizer [trade name: ADK STAB LA-87 commercially available from ADEKA CORPORATION], and 1.0 part of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 82° C. to 91° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 75° C.

After 0.9 parts of a 5% aqueous solution of potassium persulfate was added to the reaction vessel, the contents in the reaction vessel were reacted at 75° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 57 nm.

Example 37

A reaction vessel equipped with a stirring device, a temperature sensor, a cooling pipe, a conduit for introducing nitrogen and a dropping funnel was charged with 67 parts of deionized water, 10.0 parts of a polyoxyalkylene alkenyl ether [trade name: LATEMUL PD-420 commercially available from Kao Corporation, HLB: 12.6] as a nonionic emulsifier, 2.9 parts of MMA, 8.1 parts of CHMA, 1.0 part of St, 0.3 parts of 1,6HXA, 4.4 parts of EHC, 2.5 parts of an ultraviolet absorbing agent [trade name: Tinuvin (registered trademark) 400 commercially available from BASF SE], 0.5 parts of an ultraviolet absorbing agent [trade name: Tinuvin (registered trademark) 479 commercially available from BASF SE], 2.0 parts of an oil-soluble ultraviolet absorbing agent [trade name: SB-UVA650 commercially available from SHUANG BANG INDUSTRIAL CORP.], 1.0 part of a hindered amine light stabilizer [trade name: ADK STAB LA-87 commercially available from ADEKA CORPORATION], and 0.3 parts of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 86° C. to 91° C.

After the phase inversion temperature of the mixture was measured, the reaction vessel was heated with a water bath under stirring while nitrogen gas was introduced into the reaction vessel.

After the internal temperature of the reaction vessel reached 92° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 75° C.

After 0.9 parts of a 5% aqueous solution of potassium persulfate was added to the reaction vessel, the contents in the reaction vessel were reacted at 75° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 55 nm.

Example 38

A reaction vessel equipped with a stirring device, a temperature sensor, a cooling pipe, a conduit for introducing nitrogen and a dropping funnel was charged with 67 parts of deionized water, 10.4 parts of a polyoxyalkylene alkenyl ether [trade name: LATEMUL PD-420 commercially available from Kao Corporation, HLB: 12.6] as a nonionic emulsifier, 2.9 parts of MMA, 7.7 parts of CHMA, 0.8 parts of St, 0.3 parts of 1,6HXA, 4.4 parts of EHC, 2.0 parts of an ultraviolet absorbing agent [trade name: Tinuvin (registered trademark) 400 commercially available from BASF SE], 2.0 parts of an ultraviolet absorbing agent [trade name: Tinuvin (registered trademark) 479 commercially available from BASF SE], 1.0 part of an ultraviolet absorbing agent [trade name: Tinuvin (registered trademark) 970 commercially available from BASF SE], 1.0 part of a hindered amine light stabilizer [trade name: ADK STAB LA-87 commercially available from ADEKA CORPORATION], and 0.5 parts of an oil-soluble chromium complex salt black dye [trade name: VALIFAST BLACK 3810 commercially available from Orient Chemical Industries Co., Ltd.]. A part of the resulting mixture was taken out from the reaction vessel, and a phase inversion temperature of the mixture was determined in the same manner as in Example 1. As a result, the phase inversion temperature was from 80° C. to 88° C.

After the phase inversion temperature of the mixture was measured, the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, a reaction vessel was charged with 100 parts of the monomer emulsion particles-containing aqueous dispersion obtained in the above, and 2.6 parts of a 25% aqueous solution of an anionic emulsifier [trade name: ADEKA REASOAP SR-20 commercially available from ADEKA CORPORATION] was added to the reaction vessel. After the contents in the reaction vessel were stirred at room temperature for 30 minutes while nitrogen gas was introduced into the reaction vessel, the reaction vessel was put into a water bath, and the temperature of the reaction vessel was raised under stirring until the internal temperature of the reaction vessel reached 75° C.

After 0.9 parts of a 5% aqueous solution of potassium persulfate was added to the reaction vessel, the contents in the reaction vessel were reacted at 75° C. for 1 hour, and then the contents were heated at 80° C. for 5 hours under stirring, to polymerize the monomers included in the monomer emulsion particles, and thereby a polymer emulsion particles-containing aqueous dispersion was obtained.

The average particle diameter of the polymer emulsion particles included in the polymer emulsion particles-containing aqueous dispersion obtained in the above was determined in the same manner as mentioned above. As a result, the average particle diameter of the polymer emulsion particles was 50 nm.

Comparative Example 1

A reaction vessel equipped with a stirring device, a temperature sensor, a cooling pipe, a conduit for introducing nitrogen and a dropping funnel was charged with 70 parts of deionized water, 9 parts of a polyoxyalkylene alkenyl ether [trade name: LATEMUL PD-420 commercially available from Kao Corporation, HLB: 12.6] as a nonionic emulsifier, 9 parts of CHMA, 9 parts of LMA, and 3 parts of an ultraviolet absorbing agent [trade name: Tinuvin (registered trademark) 400 commercially available from BASF SE]. A part of the resulting mixture was taken out from the reaction vessel, and a phase inversion temperature of the mixture was determined in the same manner as in Example 1. As a result, the phase inversion temperature was from 80° C. to 92° C.

After the phase inversion temperature of the mixture was measured, the reaction vessel was heated with a water bath under stirring while nitrogen gas was introduced into the reaction vessel.

After the internal temperature of the reaction vessel reached 94° C., the reaction vessel was taken out from the water bath, and air-cooled down under stirring until the internal temperature of the reaction vessel reached 40° C. or lower, to obtain a monomer emulsion particles-containing aqueous dispersion.

The dispersion stability of the monomer emulsion particles-containing aqueous dispersion obtained in the above and an average particle diameter of the monomer emulsion particles were determined in the same manner as in Example 1. The results are shown in Table 2.

Next, the monomer emulsion particles-containing aqueous dispersion obtained in the above was allowed to stand for 12 hours at room temperature. As a result, the monomer emulsion particles were separated from an aqueous medium.

Comparative Example 2

A reaction vessel equipped with a stirring device, a temperature sensor, a cooling pipe, a conduit for introducing nitrogen and a dropping funnel was charged with 70 parts of deionized water, 10 parts of a polyoxyalkylene alkenyl ether [trade name: LATEMUL PD-420 commercially available from Kao Corporation, HLB: 12.6] as a nonionic emulsifier, 17 parts of CHMA, and 3 parts of an ultraviolet absorbing agent [trade name: Tinuvin (registered trademark) 400 commercially available from BASF SE], and the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until the internal temperature of the reaction vessel reached 30° C. or lower, to obtain a monomer emulsion particles-containing aqueous dispersion. However, when the internal temperature of the reaction vessel reached 30° C., the monomer emulsion particles have already been separated from an aqueous medium. From this fact, it can be seen that the monomer emulsion particles-containing aqueous dispersion obtained in the above was significantly inferior in dispersion stability.

Incidentally, even when the monomer emulsion particles-containing aqueous dispersion obtained in the above was heated to 100° C., a phase inversion temperature could not be observed.

Comparative Example 3

A reaction vessel equipped with a stirring device, a temperature sensor, a cooling pipe, a conduit for introducing nitrogen and a dropping funnel was charged with 77 parts of deionized water, 1.8 parts of a 25% aqueous solution of an anionic emulsifier [trade name: ADEKA REASOAP SR-20 commercially available from ADEKA CORPORATION], 20 parts of MMA, 1 part of hexadecane, and 0.2 part of the phthalocyanine-based near-infrared absorbing dye represented by the formula (I), and the reaction vessel was heated with a water bath under stirring while nitrogen gas was introduced into the reaction vessel.

After the internal temperature of the reaction vessel reached 90° C., the reaction vessel was taken out from the water bath, and air-cooled down under stirring until the internal temperature of the reaction vessel reached 30° C. or lower, to obtain a monomer emulsion particles-containing aqueous dispersion. However, when the internal temperature of the reaction vessel reached 30° C., the monomer emulsion particles have already been separated from an aqueous medium. From this fact, it can be seen that the monomer emulsion particles-containing aqueous dispersion obtained in the above was significantly inferior in dispersion stability.

Incidentally, even when the monomer emulsion particles-containing aqueous dispersion obtained in the above was heated to 100° C., a phase inversion temperature could not be observed.

TABLE 1

| Ex. and Comp. Ex. No. | Physical properties of monomer emulsion particles-containing aqueous dispersion: Dispersion stability After 12 hours | Dispersion stability After 14 days | Average particle diameter (mm) Just after production | Average particle diameter (mm) After 14 days |
|---|---|---|---|---|
| Ex. 1 | ○ | ○ | 61 | 60 |
| Ex. 2 | ○ | ○ | 90 | 91 |
| Ex. 3 | ○ | ○ | 65 | 65 |
| Ex. 4 | ○ | ○ | 70 | 72 |
| Ex. 5 | ○ | ○ | 120 | 118 |
| Ex. 6 | ○ | ○ | 60 | 60 |
| Ex. 7 | ○ | ○ | 72 | 70 |
| Ex. 8 | ○ | ○ | 117 | 120 |
| Ex. 9 | ○ | ○ | 70 | 70 |
| Ex. 10 | ○ | ○ | 65 | 63 |
| Ex. 11 | ○ | ○ | 60 | 61 |
| Ex. 12 | ○ | ○ | 65 | 65 |
| Ex. 13 | ○ | ○ | 62 | 62 |
| Ex. 14 | ○ | ○ | 80 | 81 |
| Ex. 15 | ○ | ○ | 75 | 77 |
| Ex. 16 | ○ | ○ | 65 | 61 |
| Ex. 17 | ○ | ○ | 58 | 55 |
| Ex. 18 | ○ | ○ | 62 | 64 |
| Ex. 19 | ○ | ○ | 128 | 124 |
| Ex. 20 | ○ | ○ | 81 | 80 |

TABLE 2

| Ex. and Comp. Ex. No. | Physical properties of monomer emulsion particles-containing aqueous dispersion: Dispersion stability After 12 hours | Dispersion stability After 14 days | Average particle diameter (nm) Just after production | Average particle diameter (nm) After 14 days |
|---|---|---|---|---|
| Ex. 21 | ○ | ○ | 58 | 56 |
| Ex. 22 | ○ | ○ | 43 | 43 |
| Ex. 23 | ○ | ○ | 45 | 43 |
| Ex. 24 | ○ | ○ | 55 | 53 |
| Ex. 25 | ○ | ○ | 40 | 43 |
| Ex. 26 | ○ | ○ | 50 | 51 |
| Ex. 27 | ○ | ○ | 77 | 79 |
| Ex. 28 | ○ | ○ | 51 | 49 |
| Ex. 29 | ○ | ○ | 53 | 52 |
| Ex. 30 | ○ | ○ | 44 | 44 |
| Ex. 31 | ○ | ○ | 47 | 49 |
| Ex. 32 | ○ | ○ | 55 | 58 |
| Ex. 33 | ○ | ○ | 55 | 56 |
| Ex. 34 | ○ | ○ | 63 | 61 |
| Ex. 35 | ○ | ○ | 48 | 45 |
| Ex. 36 | ○ | ○ | 55 | 57 |

TABLE 2-continued

| Ex. and Comp. Ex. No. | Physical properties of monomer emulsion particles-containing aqueous dispersion | | | |
|---|---|---|---|---|
| | Dispersion stability | | Average particle diameter (nm) | |
| | After 12 hours | After 14 days | Just after production | After 14 days |
| Ex. 37 | ○ | ○ | 57 | 59 |
| Ex. 38 | ○ | ○ | 51 | 50 |
| Comp. Ex. 1 | X | X | 220 | Separated |
| Comp. Ex. 2 | X | X | — | — |
| Comp. Ex. 3 | X | X | — | — |

From the results shown in Table 1 and Table 2, according to each working example, it can be seen that a monomer emulsion particles-containing aqueous dispersion in which monomer emulsion particles having a small average particle diameter are stably dispersed over a long period of time is obtained without using a mixer for a paint having a high viscosity or a high-pressure homogenizer.

In addition, according to Examples 21 to 38, the average particle diameter of the polymer emulsion particles obtained by using the monomer emulsion particles-containing aqueous dispersion is substantially the same as the average particle diameter of the monomer emulsion particles used as the raw material, so that it can be seen that the average particle diameter of the monomer emulsion particles can be maintained.

Example 39

A reaction vessel equipped with a stirring device, a temperature sensor, a cooling pipe, a conduit for introducing nitrogen and a dropping funnel was charged with 13.3 parts of the polymer emulsion particles-containing aqueous dispersion obtained in Example 11 and 26 parts of deionized water, and the reaction vessel was heated to 80° C. under stirring by using a water bath.

While the internal temperature of the reaction vessel was maintained to 80° C., the reaction vessel was charged with 2.28 parts of a 3.5% aqueous solution of ammonium persulfate, and contents in the reaction vessel were stirred for 10 minutes. Thereafter, a mixed solution of 16 parts of deionized water, 5.76 parts of a 25% aqueous solution of an anionic emulsifier [trade name: ADEKA REASOAP SR-20 commercially available from ADEKA CORPORATION], 14 parts of MMA, 12.6 parts of EHA, 8 parts of CHMA, 0.8 parts of a hindered amine light stabilizer [trade name: ADK STAB LA-87 commercially available from ADEKA CORPORATION] and 0.6 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 11. The nonvolatile content of the polymer emulsion particles-containing aqueous dispersion having the resin layer obtained in the above was 41.8% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 104 nm.

Example 40

A reaction vessel equipped with a stirring device, a temperature sensor, a cooling pipe, a conduit for introducing nitrogen and a dropping funnel was charged with 26.4 parts of the polymer emulsion particles-containing aqueous dispersion obtained in Example 11 and 44.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 5.8 parts of deionized water, 3.76 parts of a 25% aqueous solution of an anionic emulsifier [trade name: ADEKA REASOAP SR-20 commercially available from ADEKA CORPORATION], 8.5 parts of MMA, 4.8 parts of EHA, 4.1 parts of CHMA, 0.5 parts of a hindered amine light stabilizer [trade name: ADK STAB LA-87 commercially available from ADEKA CORPORATION] and 0.3 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 11. The nonvolatile content of the polymer emulsion particles-containing aqueous dispersion having the resin layer obtained in the above was 26.7% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 75 nm.

Example 41

A reaction vessel equipped with a stirring device, a temperature sensor, a cooling pipe, a conduit for introducing nitrogen and a dropping funnel was charged with 24 parts of the polymer emulsion particles-containing aqueous dispersion obtained in Example 27 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.76 parts of a 25% aqueous solution of an anionic emulsifier [trade name: ADEKA REASOAP SR-20 commercially available from ADEKA CORPORATION], 8.9 parts of MMA, 8 parts of EHA, 5.1 parts of CHMA, 0.5 parts of a hindered amine light stabilizer [trade name: ADK STAB LA-87 commercially available from ADEKA CORPORATION] and 0.4 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 27. The nonvolatile content of the polymer emulsion particles-containing aqueous dispersion having the resin layer obtained in the above was 30.9% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 96 nm.

Example 42

A reaction vessel equipped with a stirring device, a temperature sensor, a cooling pipe, a conduit for introducing nitrogen and a dropping funnel was charged with 24.0 parts of the polymer emulsion particles-containing aqueous dispersion obtained in Example 1 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.76 parts of a 25% aqueous solution of an anionic emulsifier [trade name: ADEKA REASOAP SR-20 commercially available from ADEKA CORPORATION], 8.9 parts of MMA, 8 parts of EHA, 5.1 parts of CHMA, 0.5 parts of a hindered amine light stabilizer [trade name: ADK STAB LA-87 commercially available from ADEKA CORPORATION] and 0.4 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 1. The nonvolatile content of the polymer emulsion particles-containing aqueous dispersion having the resin layer obtained in the above was 30.9% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 87 nm.

Example 43

A reaction vessel equipped with a stirring device, a temperature sensor, a cooling pipe, a conduit for introducing nitrogen and a dropping funnel was charged with 12.3 parts of the polymer emulsion particles-containing aqueous dispersion obtained in Example 21 and 40.4 parts of deionized water, and the reaction vessel was heated to 80° C. under stirring by using a water bath.

While the internal temperature of the reaction vessel was maintained to 80° C., the reaction vessel was charged with 2.28 parts of a 3.5% aqueous solution of ammonium persulfate, and contents in the reaction vessel were stirred for 10 minutes. Thereafter, a mixed solution of 7.51 parts of deionized water, 5.68 parts of a 25% aqueous solution of an anionic emulsifier [trade name: ADEKA REASOAP SR-20 commercially available from ADEKA CORPORATION], 13.8 parts of MMA, 12.5 parts of EHA, 7.9 parts of CHMA, 0.6 parts of a hindered amine light stabilizer [trade name: ADK STAB LA-87 commercially available from ADEKA CORPORATION] and 0.8 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 21. The nonvolatile content of the polymer emulsion particles-containing aqueous dispersion having the resin layer obtained in the above was 40.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 96 nm.

Example 44

A reaction vessel equipped with a stirring device, a temperature sensor, a cooling pipe, a conduit for introducing nitrogen and a dropping funnel was charged with 12.3 parts of the polymer emulsion particles-containing aqueous dispersion obtained in Example 27 and 40.4 parts of deionized water, and the reaction vessel was heated to 80° C. under stirring by using a water bath.

While the internal temperature of the reaction vessel was maintained to 80° C., the reaction vessel was charged with 2.28 parts of a 3.5% aqueous solution of ammonium persulfate, and contents in the reaction vessel were stirred for 10 minutes. Thereafter, a mixed solution of 7.51 parts of deionized water, 5.68 parts of a 25% aqueous solution of an anionic emulsifier [trade name: ADEKA REASOAP SR-20 commercially available from ADEKA CORPORATION], 13.8 parts of MMA, 12.5 parts of EHA, 7.9 parts of CHMA, 0.6 parts of a hindered amine light stabilizer [trade name: ADK STAB LA-87 commercially available from ADEKA CORPORATION] and 0.8 parts of HEMA was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 27. The nonvolatile content of the polymer emulsion particles-containing aqueous dispersion having the resin layer obtained in the above was 39.7% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 118 nm.

Example 45

A reaction vessel equipped with a stirring device, a temperature sensor, a cooling pipe, a conduit for introducing nitrogen and a dropping funnel was charged with 21.0 parts of the polymer emulsion particles-containing aqueous dispersion obtained in Example 22 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.6 parts of a 25% aqueous solution of an anionic emulsifier [trade name: ADEKA REASOAP SR-20 commercially available from ADEKA CORPORATION], 6.8 parts of MMA, 6.0 parts of EHA, 3.8 parts of CHMA, 0.4 parts of a hindered amine light stabilizer [trade name: ADK STAB LA-87 commercially available from ADEKA CORPORATION], 0.3 parts of HEMA, 0.2 parts of an ultraviolet absorbing agent [trade name: RUVA-93 commercially available from Otsuka Chemical Co., Ltd.], and 0.1 parts of methacryloxypropyltrimethoxysilane [trade name: KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 22. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 60 nm.

Example 46

A reaction vessel equipped with a stirring device, a temperature sensor, a cooling pipe, a conduit for introducing nitrogen and a dropping funnel was charged with 22.9 parts of the polymer emulsion particles-containing aqueous dispersion obtained in Example 23 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.12 parts of a 25% aqueous solution of an anionic emulsifier [trade name: ADEKA REASOAP SR-20 commercially available from ADEKA CORPORATION], 5.7 parts of MMA, 5.7 parts of EHA, 3.8 parts of CHMA, 0.4 parts of a hindered amine light stabilizer [trade name: ADK STAB LA-87 commercially available from ADEKA CORPORATION], 0.3 parts of HEMA, 0.2 parts of an ultraviolet absorbing agent [trade name: RUVA-93 commercially available from Otsuka Chemical Co., Ltd.], and 1.3 parts of methacryloxypropyltrimethoxysilane [trade name of KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 23. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 62 nm.

Example 47

A reaction vessel equipped with a stirring device, a temperature sensor, a cooling pipe, a conduit for introducing nitrogen and a dropping funnel was charged with 21.0 parts of the polymer emulsion particles-containing aqueous dispersion obtained in Example 24 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.6 parts of a 25% aqueous solution of an anionic emulsifier [trade name: ADEKA REASOAP SR-20 commercially available from ADEKA CORPORATION], 6.8 parts of MMA, 6.0 parts of EHA, 3.8 parts of CHMA, 0.4 parts of a hindered amine light stabilizer [trade name: ADK STAB LA-87 commercially available from ADEKA CORPORATION], 0.3 parts of HEMA, 0.2 parts of an ultraviolet absorbing agent [trade name: RUVA-93 commercially available from Otsuka Chemical Co., Ltd.], and 0.1 parts of methacryloxypropyltrimethoxysilane [trade name of KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 24. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 72 nm.

Example 48

A reaction vessel equipped with a stirring device, a temperature sensor, a cooling pipe, a conduit for introducing nitrogen and a dropping funnel was charged with 22.9 parts of the polymer emulsion particles-containing aqueous dispersion obtained in Example 25 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.12 parts of a 25% aqueous solution of an anionic emulsifier [trade name: ADEKA REASOAP SR-20 commercially available from ADEKA CORPORATION], 5.7 parts of MMA, 5.7 parts of EHA, 3.8 parts of CHMA, 0.4 parts of a hindered amine light stabilizer [trade name: ADK STAB LA-87 commercially available from ADEKA CORPORATION], 0.3 parts of HEMA, 0.2 parts of an ultraviolet absorbing agent [trade name: RUVA-93 commercially available from Otsuka Chemical Co., Ltd.], and 1.3 parts of methacryloxypropyltrimethoxysilane [trade name of KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 25. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 61 nm.

Example 49

A reaction vessel equipped with a stirring device, a temperature sensor, a cooling pipe, a conduit for introducing nitrogen and a dropping funnel was charged with 21.0 parts of the polymer emulsion particles-containing aqueous dispersion obtained in Example 26 and 40.4 parts of deionized water, and the reaction vessel was heated to 80° C. under stirring by using a water bath.

While the internal temperature of the reaction vessel was maintained to 80° C., the reaction vessel was charged with 1.43 parts of a 3.5% aqueous solution of ammonium persulfate, and contents in the reaction vessel were stirred for 10 minutes. Thereafter, a mixed solution of 7.51 parts of deionized water, 3.6 parts of a 25% aqueous solution of an anionic emulsifier [trade name: ADEKA REASOAP SR-20 commercially available from ADEKA CORPORATION], 6.8 parts of MMA, 6.0 parts of EHA, 3.8 parts of CHMA, 0.4 parts of a hindered amine light stabilizer [trade name: ADK STAB LA-87 commercially available from ADEKA CORPORATION], 0.3 parts of HEMA, 0.2 parts of an ultraviolet absorbing agent [trade name: RUVA-93 commercially available from Otsuka Chemical Co., Ltd.], and 0.1 parts of methacryloxypropyltrimethoxysilane [trade name of KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower, to give a polymer emulsion particles-containing aqueous dispersion having a resin layer made by polymerization of a monomer component for forming a resin layer on the surface of the polymer emulsion particles obtained in Example 26. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 63 nm.

Example 50

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 28 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 6.0 parts of MMA, 6.2 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], and 0.1 parts of methacryloxypropyltrimethoxysilane [trade name of KBM-503 commercially available from Shin-Etsu Chemical Co., Ltd.] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 28. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 68 nm.

Example 51

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 28 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 6.0 parts of MMA, 6.1 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name of KBM-503 commercially available from Shin-Etsu Chemical Co., Ltd.], and 0.1 parts of an oil-soluble chromium complex salt red dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 28. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 70 nm.

Example 52

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 28 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 5.8 parts of MMA, 5.9 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], 0.2 parts of an ultraviolet absorbing agent [trade name: Tinuvin (registered trademark) 970 commercially available from BASF SE], and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 28. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 75 nm.

Example 53

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 29 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 6.0 parts of MMA, 6.1 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name of KBM-503 commercially available from Shin-Etsu Chemical Co., Ltd.], and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 29. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 63 nm.

Example 54

A reaction vessel equipped with a stirring device, a temperature sensor, a cooling pipe, a conduit for introducing nitrogen and a dropping funnel was charged with 41.1 parts of the polymer emulsion particles-containing aqueous dispersion obtained in Example 31 and 35.1 parts of deionized water, and the reaction vessel was heated to 80° C. under stirring by using a water bath.

While the internal temperature of the reaction vessel was maintained to 80° C., the reaction vessel was charged with 1.4 parts of a 3.5% aqueous solution of ammonium persulfate, and contents in the reaction vessel were stirred for 10 minutes. Thereafter, a mixed solution of 7.1 parts of deionized water, 1.6 parts of a 25% aqueous solution of an anionic emulsifier [trade name: ADEKA REASOAP SR-20 commercially available from ADEKA CORPORATION], 4.5 parts of MMA, 4.7 parts of EHA, 2.8 parts of CHMA, 0.6 parts of a hindered amine light stabilizer [trade name: ADK STAB LA-87 commercially available from ADEKA CORPORATION], 0.2 parts of HEMA, 0.4 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], 0.1 parts of an ultraviolet absorbing agent [trade name: Tinuvin (registered trademark) 970 commercially available from BASF SE], 0.1 parts of an oil-soluble ultraviolet absorbing agent [trade name: ADK STAB LA-F70 commercially available from ADEKA CORPORATION], 0.1 parts of an oil-soluble chromium complex salt red dye and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 31. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 55 nm.

Example 55

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 32 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 5.8 parts of MMA, 5.9 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], 0.1 parts of an ultraviolet absorbing agent [trade name: Tinuvin (registered trademark) 970 commercially available from BASF SE], and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 32. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 71 nm.

Example 56

A reaction vessel equipped with a stirring device, a temperature sensor, a cooling pipe, a conduit for introducing nitrogen and a dropping funnel was charged with 30.6 parts of the polymer emulsion particles-containing aqueous dispersion obtained in Example 33 and 31.4 parts of deionized water, and the reaction vessel was heated to 80° C. under stirring by using a water bath.

While the internal temperature of the reaction vessel was maintained to 80° C., the reaction vessel was charged with 1.7 parts of a 3.5% aqueous solution of ammonium persulfate, and contents in the reaction vessel were stirred for 10 minutes. Thereafter, a mixed solution of 13.9 parts of deionized water, 2.9 parts of a 25% aqueous solution of an anionic emulsifier [trade name: ADEKA REASOAP SR-20 commercially available from ADEKA CORPORATION], 6.7 parts of MMA, 6.9 parts of EHA, 4.1 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], 0.2 parts of an ultraviolet absorbing agent [trade name: Tinuvin (registered trademark) 970 commercially available from BASF SE], and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 33. The nonvolatile content of the polymer emulsion particles-containing aqueous dispersion having the resin layer obtained in the above was 30.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 67 nm.

Example 57

A reaction vessel equipped with a stirring device, a temperature sensor, a cooling pipe, a conduit for introducing nitrogen and a dropping funnel was charged with 30.6 parts of the polymer emulsion particles-containing aqueous dispersion obtained in Example 34 and 31.4 parts of deionized water, and the reaction vessel was heated to 80° C. under stirring by using a water bath.

While the internal temperature of the reaction vessel was maintained to 80° C., the reaction vessel was charged with 1.7 parts of a 3.5% aqueous solution of ammonium persulfate, and contents in the reaction vessel were stirred for 10 minutes. Thereafter, a mixed solution of 13.9 parts of deionized water, 2.9 parts of a 25% aqueous solution of an anionic emulsifier [trade name: ADEKA REASOAP SR-20 commercially available from ADEKA CORPORATION], 6.7 parts of MMA, 6.9 parts of EHA, 4.1 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], 0.2 parts of an ultraviolet absorbing agent [trade name: Tinuvin (registered trademark) 970 commercially available from BASF SE], and 0.1 parts of an oil-soluble blue dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 34. The nonvolatile content of the polymer emulsion particles-containing aqueous dispersion having the resin layer obtained in the above was 30.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 78 nm.

Example 58

A reaction vessel equipped with a stirring device, a temperature sensor, a cooling pipe, a conduit for introducing nitrogen and a dropping funnel was charged with 27.9 parts of the polymer emulsion particles-containing aqueous dispersion obtained in Example 36 and 40.4 parts of deionized water, and the reaction vessel was heated to 80° C. under stirring by using a water bath.

While the internal temperature of the reaction vessel was maintained to 80° C., the reaction vessel was charged with 2.6 parts of a 3.5% aqueous solution of ammonium persulfate, and contents in the reaction vessel were stirred for 10 minutes. Thereafter, a mixed solution of 9.1 parts of deionized water, 2.5 parts of a 25% aqueous solution of an anionic emulsifier [trade name: ADEKA REASOAP SR-20 commercially available from ADEKA CORPORATION], 5.8 parts of MMA, 5.9 parts of EHA, 3.7 parts of CHMA, 0.4 parts of a hindered amine light stabilizer [trade name: ADK STAB LA-87 commercially available from ADEKA CORPORATION], 0.3 parts of HEMA, 0.6 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.2 parts of an ultraviolet absorbing agent [trade name: Tinuvin (registered trademark) 479 commercially available from BASF SE], and 0.2 parts of an ultraviolet absorbing agent [trade name: Tinuvin (registered trademark) 970 commercially available from BASF SE] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 36. The nonvolatile content of the polymer emulsion particles-containing aqueous dispersion having the resin layer obtained in the above was 26.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 70 nm.

Example 59

A reaction vessel equipped with a stirring device, a temperature sensor, a cooling pipe, a conduit for introducing nitrogen and a dropping funnel was charged with 32.6 parts of the polymer emulsion particles-containing aqueous dispersion obtained in Example 37 and 28.0 parts of deionized water, and the reaction vessel was heated to 80° C. under stirring by using a water bath.

While the internal temperature of the reaction vessel was maintained to 80° C., the reaction vessel was charged with 1.8 parts of a 3.5% aqueous solution of ammonium persulfate, and contents in the reaction vessel were stirred for 10 minutes. Thereafter, a mixed solution of 13.2 parts of deionized water, 3.0 parts of a 25% aqueous solution of an anionic emulsifier [trade name: ADEKA REASOAP SR-20 commercially available from ADEKA CORPORATION], 7.3 parts of MMA, 7.5 parts of EHA, 4.5 parts of CHMA, 0.5 parts of a hindered amine light stabilizer [trade name: ADK STAB LA-87 commercially available from ADEKA CORPORATION], 0.3 parts of HEMA, 0.7 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.1 parts of an ultraviolet absorbing agent [trade name: Tinuvin (registered trademark) 400 commercially available from BASF SE], 0.1 parts of an ultraviolet absorbing agent [trade name: Tinuvin (registered trademark) 479 commercially available from BASF SE], 0.2 parts of an ultraviolet absorbing agent [trade name: Tinuvin (registered trademark) 970 commercially available from BASF SE], and 0.1 parts of an oil-soluble chromium complex salt black dye was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 37. The nonvolatile content of the polymer emulsion particles-containing aqueous dispersion having the resin layer obtained in the above was 32.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 69 nm.

Example 60

A reaction vessel equipped with a stirring device, a temperature sensor, a cooling pipe, a conduit for introducing nitrogen and a dropping funnel was charged with 32.6 parts of the polymer emulsion particles-containing aqueous dispersion obtained in Example 38 and 28.0 parts of deionized water, and the reaction vessel was heated to 80° C. under stirring by using a water bath.

While the internal temperature of the reaction vessel was maintained to 80° C., the reaction vessel was charged with 1.8 parts of a 3.5% aqueous solution of ammonium persulfate, and contents in the reaction vessel were stirred for 10 minutes. Thereafter, a mixed solution of 13.2 parts of deionized water, 3.0 parts of a 25% aqueous solution of an anionic emulsifier [trade name: ADEKA REASOAP SR-20 commercially available from ADEKA CORPORATION], 7.6 parts of MMA, 7.6 parts of EHA, 4.7 parts of CHMA, 0.5 parts of a hindered amine light stabilizer [trade name: ADK STAB LA-87 commercially available from ADEKA CORPORATION], 0.8 parts of an ultraviolet absorbing agent [trade name: RUVA-93 commercially available from Otsuka Chemical Co., Ltd.], 0.1 parts of methacryloxypropyltrimethoxysilane [trade name: KBM-503 commercially available from Shin-Etsu Chemical Co., Ltd.], 0.1 parts of an ultraviolet absorbing agent [trade name: Tinuvin (registered trademark) 400 commercially available from BASF SE], 0.1 parts of an ultraviolet absorbing agent [trade name: Tinuvin (registered trademark) 479 commercially available from BASF SE], 0.1 parts of an ultraviolet absorbing agent [trade name: Tinuvin (registered trademark) 970 commercially available from BASF SE], and 0.1 parts of an oil-soluble ultraviolet absorbing agent [trade name: ADK STAB LA-F70 commercially available from ADEKA CORPORATION] was added dropwise to the reaction vessel over 90 minutes under stirring while the internal temperature of the reaction vessel was maintained to 80° C.

After 60 minutes passed from the end of the dropping, 0.1 parts of a 25% aqueous ammonium solution was added to the reaction vessel, to neutralize the contents in the reaction vessel. After 30 minutes passed from the end of the neutralization, the reaction vessel was taken out from the water bath, and the internal of the reaction vessel was cooled to 40° C. or lower. Thereafter, 0.1 parts of an antiseptic agent [trade name: KORDEK MLX commercially available from DuPont de Nemours, Inc.] was added to the reaction vessel, to give a polymer emulsion particles-containing aqueous dispersion having a resin layer made by polymerization of a monomer component for forming a resin layer on the surface of the polymer emulsion particles obtained in Example 38. The nonvolatile content of the polymer emulsion particles-containing aqueous dispersion having the resin layer obtained in the above was 32.0% by mass.

The average particle diameter of the polymer emulsion particles contained in the polymer emulsion particles-containing aqueous dispersion having the resin layer obtained in the above was determined just after preparation of the polymer emulsion particles-containing aqueous dispersion in the same manner as mentioned above. As a result, the average particle diameter was 67 nm.

Experimental Example 1

The weather resistance of the polymer emulsion particles-containing aqueous dispersion obtained in example 41, the polymer emulsion particles-containing aqueous dispersion obtained in example 42, the polymer emulsion particles-containing aqueous dispersion obtained in example 43, and the polymer emulsion particles-containing aqueous dispersion obtained in example 44 were evaluated in accordance with the following method for evaluating weather resistance.

In addition, as a conventional polymer emulsion particles-containing aqueous dispersion, a polymer emulsion particles-containing aqueous dispersion which was prepared by mixing 100 parts of an acrylic resin emulsion [trade name: UDOUBLE EF-015 commercially available from NIPPON SHOKUBAI CO., LTD.] with 4 parts of an ultraviolet absorbing agent [trade name: Tinuvin (registered trademark) 400DW commercially available from BASF SE] was used, and the weather resistance of the polymer emulsion particles-containing aqueous dispersion was evaluated in the same manner as the above.

(Method for Evaluating Weather Resistance 1)

A composition prepared by adding 10 parts of 2,2,4-trimethyl-1,3-pentanediol monoisobutyrate [product number: CS-12 commercially available from JNC Corporation] to 100 parts of an acrylic polymer emulsion particles-containing aqueous dispersion [trade name: ACRYSET commercially available from NIPPON SHOKUBAI CO., LTD.] was used as a sample. The sample was applied to a white acrylic resin plate with an applicator so that a thickness of a coating film was 60 μm after drying, and the coating film was dried at 23° C. in the air, to give a test plate on which the coating film was formed. Each of the acrylic polymer emulsion particles-containing aqueous dispersions was applied to the coating film of the test plate with an applicator so that a thickness of a coating film was 20 μm after drying, and the coating film was dried at 23° C. in the air, to give a test plate on which the coating film was formed. A color difference ($L_0$, $a_0$, $b_0$) of the coating surface of the test plate obtained in the above was determined with a color difference meter [trade name: Spectrophotometric type color difference meter SE-2000 commercially available from NIPPON DENSHOKU INDUSTRIES Co., Ltd.].

Next, a test of irradiation of ultraviolet rays was carried out for 1200 hours under the following conditions of irradiation of ultraviolet rays. Thereafter, the color difference ($L_1$, $a_1$, $b_1$) of the coating surface of the test plate was determined, and a color change (ΔE) between the color difference before irradiation of ultraviolet rays and the color difference after irradiation of ultraviolet rays was determined in accordance with the equation:

$$\Delta E=[(L_1-L_0)^2+(a_1-a_0)^2+(b_1-b_0)^2]^{1/2}.$$

As a result, when the polymer emulsion particles-containing aqueous dispersion obtained in Example 41 was used, the color change (ΔE) was 0.15; when the polymer emulsion particles-containing aqueous dispersion obtained in Example 42 was used, the color change (ΔE) was 0.32; when the polymer emulsion particles-containing aqueous dispersion obtained in Example 43 was used, the color change (ΔE) was 0.27; and when the polymer emulsion particles-containing aqueous dispersion obtained in Example 44 was used, the color change (ΔE) was 0.31. In contrast, when the conventional polymer emulsion particles-containing aqueous dispersion was used, the color change (ΔE) was 0.84. From this fact, it was confirmed that the polymer emulsion particles-containing aqueous dispersion obtained in each working example was excellent in weather resistance, as compared with the conventional polymer emulsion particles-containing aqueous dispersion.

(Conditions of Irradiation of Ultraviolet Rays)

Under the test condition according to JIS A6909, ultraviolet rays are irradiated with a weather meter [trade name: Super Xenon Weather Meter SX2D-75 commercially available from Suga Test Instruments Co., Ltd.].

Experimental Example 2

Each haze of the polymer emulsion particles-containing aqueous dispersion obtained in example 45, the polymer emulsion particles-containing aqueous dispersion obtained in example 46, the polymer emulsion particles-containing aqueous dispersion obtained in example 47, the polymer emulsion particles-containing aqueous dispersion obtained in example 48, the polymer emulsion particles-containing aqueous dispersion obtained in example 49, the polymer emulsion particles-containing aqueous dispersion obtained in example 50, the polymer emulsion particles-containing aqueous dispersion obtained in example 51, the polymer emulsion particles-containing aqueous dispersion obtained in example 52, the polymer emulsion particles-containing aqueous dispersion obtained in example 53, the polymer emulsion particles-containing aqueous dispersion obtained in example 54, the polymer emulsion particles-containing aqueous dispersion obtained in example 55, the polymer emulsion particles-containing aqueous dispersion obtained in example 56, the polymer emulsion particles-containing aqueous dispersion obtained in example 57, the polymer emulsion particles-containing aqueous dispersion obtained in example 58, and the polymer emulsion particles-containing aqueous dispersion obtained in example 60 was determined in accordance with the following method for determining a haze:

In order to compare with the polymer emulsion particles-containing aqueous dispersion obtained in each working example, a polymer emulsion particles-containing aqueous dispersion was prepared by adding 1.35 parts of an oil-soluble azo red dye [trade name: Oil Color Red TR-71 commercially available from CHUO SYNTHETIC CHEMICAL CO., LTD.] or 1.35 parts of an oil-soluble chromium complex salt red dye to 100 parts of an acrylic resin emulsion [trade name: UDOUBLE EF-015 commercially available from NIPPON SHOKUBAI CO., LTD.]. However, in any case of the polymer emulsion particles-containing aqueous dispersions, the dye precipitated, and the dye was not dispersed in the polymer emulsion particles-containing aqueous dispersion.

In addition, a conventional polymer emulsion particles-containing aqueous dispersion was prepared by mixing 100 parts of an acrylic resin emulsion [trade name: UDOUBLE EF-015 commercially available from NIPPON SHOKUBAI CO., LTD.] with 3.7 parts of aqueous dispersion of a red pigment [trade name: EMACOL RED 3303 commercially available from Sanyo Color Works, LTD.]. A haze of the conventional polymer emulsion particles-containing aqueous dispersion obtained in the above was determined in the same manner as mentioned above.

A haze of each polymer emulsion particles-containing aqueous dispersion was determined. As a result, the haze was 2.1 as to the polymer emulsion particles-containing aqueous dispersion obtained in Example 45; 4.3 as to the polymer emulsion particles-containing aqueous dispersion obtained in Example 46; 2.3 as to the polymer emulsion particles-containing aqueous dispersion obtained in Example 47; 4.7 as to the polymer emulsion particles-containing aqueous dispersion obtained in Example 48; and 2.2 as to the polymer emulsion particles-containing aqueous dispersion obtained in Example 49. In addition, the haze was 0.4 as to the polymer emulsion particles-containing aqueous dispersion obtained in Example 50; 0.8 as to the polymer emulsion particles-containing aqueous dispersion obtained in Example 51; 1.2 as to the polymer emulsion particles-containing aqueous dispersion obtained in Example 52; 0.7 as to the polymer emulsion particles-containing aqueous dispersion obtained in Example 53; 0.9 as to the polymer emulsion particles-containing aqueous dispersion obtained in Example 54; 1.3 as to the polymer emulsion particles-containing aqueous dispersion obtained in Example 55; 0.6 as to the polymer emulsion particles-containing aqueous dispersion obtained in Example 56; 0.9 as to the polymer emulsion particles-containing aqueous dispersion obtained in Example 57; 1.2 as to the polymer emulsion particles-containing aqueous dispersion obtained in Example 58; and 1.4 as to the polymer emulsion particles-containing aqueous dispersion obtained in Example 59 and the polymer emulsion particles-containing aqueous dispersion obtained in Example 60 respectively. In contrast, as to the conventional polymer emulsion particles-containing aqueous dispersion, the haze was 66.7.

From the above results, it can be seen that the polymer emulsion particles-containing aqueous dispersion obtained in each working example is significantly low in turbidity as compared with the conventional polymer emulsion particles-containing aqueous dispersion.

(Method for Determining a Haze)

Each of the acrylic polymer emulsion particles-containing aqueous dispersions was applied to a glass plate with an applicator so that a thickness of a coated film was 60 μm after drying, and dried at 80° C. for 2 hours with a dryer, to give a test plate on which the coating film was formed.

Incidentally, as to Example 60, a test plate having multilayer coating films was prepared by applying the acrylic polymer emulsion particles-containing aqueous dispersions obtained in Example 50 to a glass plate with an applicator so that a thickness of a coating film after drying was 60 μm, drying the coating film at 80° C. for 2 hours, thereafter applying the acrylic polymer emulsion particles-containing aqueous dispersion obtained in Example 60 to the coating film with an applicator so that a thickness of a coating film after drying was 60 μm, and drying the coating film at 80° C. for 2 hours with a dryer.

The haze on the surface of the coating film of the test plate obtained in the above was determined by using a spectral colorimeter [product number: CM-3700A commercially available from Konica Minolta, Inc.] in accordance with conditions prescribed in ASTM-D-1003-97-C.

Experimental Example 3

Each weather resistance of the polymer emulsion particles-containing aqueous dispersion obtained in Example 50, the polymer emulsion particles-containing aqueous dispersion obtained in Example 52, the polymer emulsion particles-containing aqueous dispersion obtained in Example 56, the polymer emulsion particles-containing aqueous dispersion obtained in Example 57, the polymer emulsion particles-containing aqueous dispersion obtained in Example 58, and the polymer emulsion particles-containing aqueous dispersion obtained in Example 60 was determined in accordance with the following method for evaluating weather resistance.

A solution was prepared by dissolving 1.3 parts of an oil-soluble chromium complex salt red dye in 20 parts of methyl ethyl ketone, and the solution was added to 100 parts of a conventional solvent-type acrylic resin [trade name: UDOUBLE S-5115 commercially available from NIPPON SHOKUBAI CO., LTD.], to give an acrylic resin solution in which the red dye was dissolved. In addition, a solution was prepared by dissolving 0.5 parts of an oil-soluble blue dye [trade name: KP Plast Blue R commercially available from KIWA Chemical Industry Co., Ltd.] in 20 parts of toluene, and the solution was added to 100 parts of a solvent-type acrylic resin [trade name: UDOUBLE S-5115 commercially available from NIPPON SHOKUBAI CO., LTD.], to give an acrylic resin solution in which the blue dye was dissolved. Each weather resistance of these acrylic resin solutions was evaluated in the same manner as mentioned above.

(Method for Evaluating Weather Resistance 2)

The polymer emulsion particles-containing aqueous dispersion obtained in Example 52, the polymer emulsion particles-containing aqueous dispersion obtained in Example 57, or the above acrylic resin solution in which the dye was dissolved was applied to an aluminum plate [length: 150 mm, width: 70 mm, and thickness: 0.8 mm, commercially available from Nippon Test Panel Co., Ltd.] with an applicator so that a thickness of a coating film after drying was 40 μm, and dried at 80° C. for 2 hours with a dryer. An ultraviolet-insulating coating agent [trade name: HALSHYBRID UV-G101 commercially available from NIPPON SHOKUBAI CO., LTD.] in an amount of 10 parts was mixed with 6 parts of toluene and 2 parts of 6-[3-(6-isocyanatohexyl)-2,4-dioxo-1,3-diazetidin-1-yl]hexyl 6-isocyanatohexylcarbamate, and the resulting paint was applied to the coating film within one hour from the start of mixing so that a thickness of the coating film after drying was 40 μm or less, and drying the coating film at 23° C. for 24 hours in the air, to give a test plate on which the coating film was formed. Incidentally, when the acrylic resin solution in which the red dye was dissolved was dried, aggregation of the dye was confirmed.

In addition, as to the polymer emulsion particles-containing aqueous dispersion obtained in Example 56, the polymer emulsion particles-containing aqueous dispersion was applied to an aluminum plate [length: 150 mm, width: 70 mm, and thickness: 0.8 mm, commercially available from Nippon Test Panel Co., Ltd.] with an applicator so that a thickness of a coating film after drying was 40 μm, and dried at 80° C. for 2 hours with a dryer, to form a coating film. Thereafter, the acrylic polymer emulsion particles-containing aqueous dispersion obtained in Example 60 was applied to the coating film with an applicator so that a thickness of the coating film after drying was 40 gm or less, and drying the coating film at 80° C. for 2 hours with a dryer. Then, a mixed solution prepared by mixing 10 parts of an ultraviolet-insulating coating agent [trade name: HALSHYBRID UV-G101 commercially available from NIPPON SHOKUBAI CO., LTD.] with 6 parts of toluene and 2 parts of 6-[3-(6-isocyanatohexyl)-2,4-dioxo-1,3-diazetidin-1-yl] hexyl 6-isocyanatohexylcarbamate was applied to the coating film within one hour from the start of mixing with an applicator so that a thickness of the coating film after drying was 40 μm or less, and drying the coating film at 23° C. for 24 hours in the air, to give a test plate on which the coating film was formed.

The color difference ($L_0$, $a_0$, $b_0$) of the coating surface of the test plate obtained in the above was determined with a color difference meter [trade name: Spectrophotometric type color difference meter SE-2000 commercially available from NIPPON DENSHOKU INDUSTRIES Co., Ltd.].

Next, ultraviolet rays were irradiated to the coating surface of the test plate for 504 hours under the following condition for irradiating ultraviolet rays, and thereafter, a color difference ($L_1$, $a_1$, $b_1$) of the coating surface of the test plate was determined. The color change (ΔE) due to irradiation of ultraviolet rays was determined in accordance with the equation:

$$\Delta E=[(L_1-L_0)^2+(a_1-a_0)^2+(b_1-b_0)^2]^{1/2}.$$

As a result, when the polymer emulsion particles-containing aqueous dispersion obtained in Example 52 was used, the color change (ΔE) was 9.8; when the polymer emulsion particles-containing aqueous dispersion obtained in Example 57 was used, the color change (ΔE) was 8.8; when the polymer emulsion particles-containing aqueous dispersion obtained in Example 50 or the polymer emulsion particles-containing aqueous dispersion obtained in Example 58 was used, the color change (ΔE) was 6.9, respectively; and when the polymer emulsion particles-containing aqueous dispersion obtained in Example 56 or the polymer emulsion particles-containing aqueous dispersion obtained in Example 60 was used, the color change (ΔE) was 7.2 respectively. In contrast, when the acrylic resin solution in which the red dye was dissolved was used, the color change (ΔE) was 37.5, and when the acrylic resin solution in which the blue dye was dissolved was used, the color change (ΔE) was 29.

From the above results, it was confirmed that the polymer emulsion particles-containing aqueous dispersion obtained in each working example was excellent in weather resistance, as compared with the conventional acrylic resin solutions.

(Conditions for Irradiating Ultraviolet Rays)

Under the following conditions, ultraviolet rays were irradiated to the coating surface of the test plate with a weather meter [trade name: Metaling Weather Meter M6T commercially available from Suga Test Instruments Co., Ltd.].

Cycle: 16 hours at irradiation and 6 hours at darkness

Irradiation intensity; 0.50 kWh

BPT temperature: 63° C. at irradiation

Relative humidity: 50% at irradiation and 98% at darkness

INDUSTRIAL APPLICABILITY

The monomer emulsion particles-containing aqueous dispersion and the polymer emulsion particles-containing aqueous dispersion according to the present invention are useful for applications such as a paint, a coating material, an ink, a pressure-sensitive adhesive, an adhesive, an electronic material, a cosmetic, a medicine, a heat storage material, a fiber, a civil engineering, and the like.

The invention claimed is:

1. A method for producing an aqueous dispersion comprising monomer emulsion particles comprising a monomer component, the method comprising:

mixing a monomer component with an aqueous medium, wherein the monomer component comprises:

(A) a monomer X comprising cyclohexyl (meth)acrylate;

(B) a nonionic emulsifier;

(C) an aliphatic organic acid-based compound having 22 to 40 carbon atoms; and (D) a lipophilic active ingredient;

heating the resulting mixture to a temperature equal to or higher than a phase inversion-initiating temperature of the mixture and lower than a boiling point of the aqueous medium under stirring; and cooling the mixture to a temperature lower than the phase inversion-initiating temperature of the mixture, wherein the total content of cyclohexyl (meth)acrylate in the monomer X is 50 to 100% by mass, a content of the monomer X in the monomer component is 25% by mass or more, and 80% by mass or less, a content of the nonionic emulsifier in the monomer component is 10% by mass or more, and 50% by mass or less, and an HLB of the nonionic emulsifier is 8 to 17, and wherein the nonionic emulsifier is a polyoxyalkylene alkenyl ether.

2. The method of claim 1, wherein the nonionic emulsifier has a hydrophilic-lipophilic balance of 10 or more, and 15 or less.

3. The method of claim 1, wherein the nonionic emulsifier comprises a nonionic emulsifier having a reactivity.

4. The method of claim 1, wherein a content of the aliphatic organic acid-based compound in the monomer component is 1% by mass or more, and 50% by mass or less.

5. The method of claim 1, wherein a content of the aliphatic organic acid-based compound in the monomer component is 1% by mass or more, and 35% by mass or less.

6. The method of claim 1, wherein a content of the lipophilic active ingredient in the monomer component is 0.03% by mass or more, and 50% by mass or less.

7. The method of claim 1, wherein a content of the lipophilic active ingredient in the monomer component is 0.03% by mass or more, and 40% by mass or less.

8. The method of claim 1, wherein the monomer emulsion particles have an average particle diameter of 10 to 200 nm.

9. The method of claim 1, wherein the phase inversion-initiating temperature of the mixture is 35° C. or higher, and 98° C. or lower.

* * * * *